(12) United States Patent
Srivastava et al.

(10) Patent No.: US 7,472,349 B1
(45) Date of Patent: Dec. 30, 2008

(54) DYNAMIC SERVICES INFRASTRUCTURE FOR ALLOWING PROGRAMMATIC ACCESS TO INTERNET AND OTHER RESOURCES

(75) Inventors: Alok Srivastava, Chelmsford, MA (US); Marco Carrer, Nashua, NH (US); Paul I. Lin, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 945 days.

(21) Appl. No.: 09/584,318

(22) Filed: May 31, 2000

Related U.S. Application Data

(60) Provisional application No. 60/137,006, filed on Jun. 1, 1999.

(51) Int. Cl.
*G06F 15/00* (2006.01)
*G06F 17/30* (2006.01)
*G06F 7/00* (2006.01)
*G06F 15/16* (2006.01)

(52) U.S. Cl. .................. 715/513; 715/516; 715/522; 715/523; 707/1; 707/3; 707/100; 707/102; 709/206; 709/227; 709/228; 709/230

(58) Field of Classification Search .............. 715/501.1, 715/513, 511, 516, 522, 523, 501; 707/1, 707/3, 46, 100, 102, 200; 705/26, 37; 709/206, 709/227, 228, 230
See application file for complete search history.

(56) References Cited

U.S. PATENT DOCUMENTS 6,041,308 A * 3/2000 Walker et al. .................. 705/14
6,064,979 A * 5/2000 Perkowski .................... 705/26
6,154,738 A * 11/2000 Call ............................. 707/4
6,226,675 B1 * 5/2001 Meltzer et al. .............. 709/223
6,542,912 B2 * 4/2003 Meltzer et al. ........... 715/501.1
2006/0047767 A1 * 3/2006 Dodrill et al. ............... 709/206

* cited by examiner

*Primary Examiner*—Heather R. Herndon
*Assistant Examiner*—Chau Nguyen
(74) *Attorney, Agent, or Firm*—Roger Kennedy

(57) ABSTRACT

A dynamic services infrastructure accepts data describing data resources and stores that data in a relational database from which it may be retrieved to handle service requests issued by application programs. The database stores Service Definition data which is initially supplied in the form of XML Service Descriptor documents which are then mapped into the database from which they may be accessed. Each Service Definition includes an input specification which identifies the address of a resource as well as the nature of the input data to be supplied to the resource with the request, and further includes an output specification which describes the nature of the output information which is supplied by the resource in response to the request. The Service Definition further includes information describing the service provider which supplies the resource, test information including fixed input and output values which permit the operability of the resource to be verified, update information which permits the infrastructure to insure that the Service Definition information is kept current, and security information which permits the system to validate users and provide secure encrypted information exchanges. When a client sends a request for services to the infrastructure, obtains the service description for the desired resource from the database, transmits an output information request to the address specified in said the service description, supplying input information meeting the specification contained in said particular service description to said particular resource, and receives and routs output information provided by said particular resource in response to said output information request to the executing application program.

18 Claims, 3 Drawing Sheets

DYNAMIC SERVICES INFRASTRUCTURE FOR ALLOWING PROGRAMMATIC ACCESS TO INTERNET AND OTHER RESOURCES

CROSS-REFERENCE TO RELATED APPLICATION

This application claims the benefit of the filing date of U.S. Provisional Patent Application Ser. No. 60/137,006 filed on Jun. 1, 1999.

COPYRIGHT NOTICE

A portion of the disclosure of this patent document contains material subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to electronic information processing systems and more particularly to methods and apparatus for providing information-based services from a plurality of diverse resources to one or more users.

BACKGROUND OF THE INVENTION

The Internet has provided access to millions of different information resources. To obtain desired information, human beings typically use browser programs to sift through web pages, web indexing services and available subject matter directories to locate useful information. While powerful tools have been made available to assist human researchers in finding what they need, the vast amount of data which is accessible cannot typically be processed by application programs. Thus, while programmatic access to data on the Internet would be extremely useful, it is not now available.

There are many resources with different characteristics to which developers have no easy programmatic access. While most provide interfaces for end-users, they provide none for applications. If developers want to make use of these resources, they have no simple programmatic interface to use. For example, many web sites provide services for stock prices; some web sites provide services giving current rates of currency exchange. Yet developers have no easy way of building an application that delivers stock prices in the currency of the user's choice, albeit all the information they need can be found on the web.

Another aspect of the problem is that different resources have different access protocols. For example, to build a payroll application, a developer may need to: (1) access a personnel payroll database for the amount of money to be transferred and the destination account, (2) send a message to a legacy system to initiate the transfer, and (3) access an employee directory service to lookup the employee's email address to send an alert email. All these resources are accessed via different protocols, such as JDBC to access the personnel database, a proprietary protocol to the use the legacy system, and LDAP for directory services. Consequently, each developer must write special code to access each of these different resources, rather than concentrating on the development of application logic.

SUMMARY OF THE INVENTION

It is accordingly an object of the present invention to provide methods and apparatus for delivering data from different resources in ways that permit programs to process and integrate that data for the benefit of end users.

In a principle aspect, the present invention takes the form of methods and apparatus for obtaining information from each of a plurality of diverse data resources having different characteristics. A separate service description for each given data resource is stored in a database called the Services Registry. Each service description includes: the address to which an information request may be transmitted; a specification of the nature of the input information to be supplied; and a description of the nature of the output information to be supplied in response to request.

Service requests identifying particular resources may be issued by application programs. A service interface program is then executed in response to each such service request to obtain the particular service description corresponding to the identified resource from the Services Registry. The interface program then transmits an output information request to the address specified in said particular service description, supplies input information meeting the specification contained in said particular service description to the resource, and routes output information provided by said particular resource to the requesting application program.

In accordance with the invention, a registration module is preferably used to accept service description information in a predetermined format, preferably in Extensible Markup Language (XML), so that the service description may be validated against a Service Descriptor Schema, which may take the form of an XML schema such as a Document Type Description (DTD), before it is stored in the Services Registry.

The stored service description may also advantageously include contact information specifying the person or entity supplying the resource described in said service description, as well as test information consisting of fixed input values and fixed output values. The stored test values enable the service interface program to perform automatic testing of the described resource by sending the fixed input values to the described resource and comparing the resulting output from the resource with the fixed output values. Further, the stored service descriptions may advantageously further include security information for ensuring that requests for output information originate from an authorized source before that request directed to the described resource is satisfied.

When a client sends a request for services to the services interface program, it obtains the service description for the desired resource from the database, transmits an output information request to the address specified in said the service description, supplying input information meeting the specification contained in said particular service description to said particular resource, and receives and routs output information provided by said particular resource in response to said output information request to the executing application program.

The Dynamic Services Framework contemplated by the present thus wraps disparate resources with a standard programmatic interface which can be accessed in standard ways, primarily using Java. A resource owner (service provider) can easily build a dynamic service descriptor specifying the input/output characteristics of accessing their resources. With the descriptor, accessing the resource becomes accessing a service through a standard simple programmatic interface. The Dynamic Services Framework provides the infrastructure and logic for abstracting the access of different resources with a single standard interface.

These and other objects, features and advantages of the present invention will become more apparent through a consideration of the following detailed description of a specific embodiment of the invention. In the course of that description, frequent reference will be made to the attached drawings.

DETAILED DESCRIPTION OF THE PREFERRED EMBODIMENT

Figure 1:
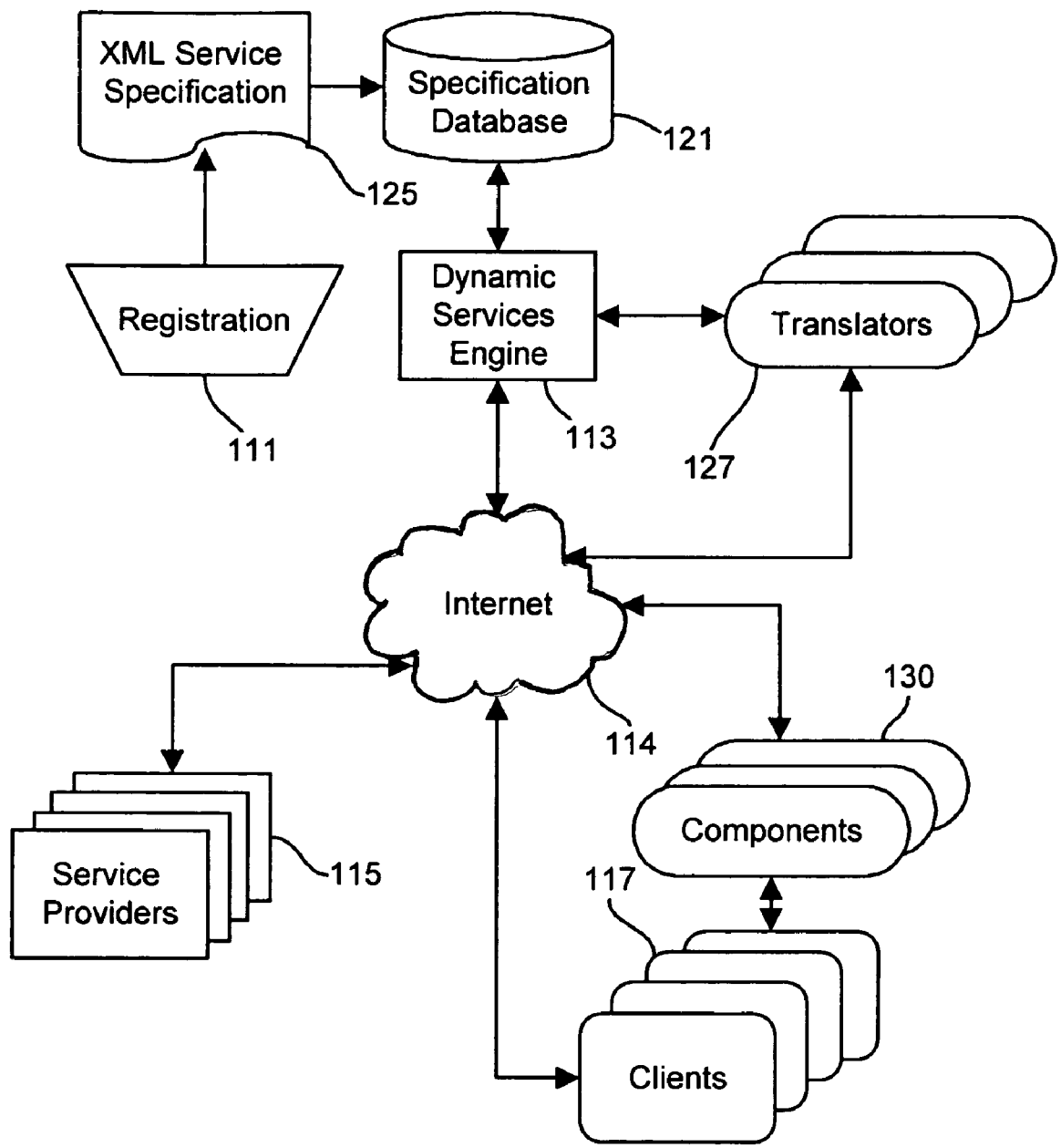
FIG. 1 is a block diagram which provides an overview of the basic methods performed by and structure of the present invention.

The present invention provides methods and apparatus for effectively converting a variety of diverse information-based resources, such as Internet web sites, databases, and other servers, into information services accessible to programs. Each service, as presented via an application program interface, conforms to a functional interface standard which provides the application programs with the metadata needed to access and integrate these resources for presentation to an end user.

1. System Overview 1.1 Glossary

The glossary of terms below introduces terms which are frequently used in the following description.

Developers: developers refer to developers of Internet applications.

Dynamic Service (Service): a component within the Internet computing model that delivers a specialized value-added functionality. A dynamic service typically comprises some content, or some process, or both, with an open programmatic interface.

Dynamic Service Engine: an engine that provides storage, access and management of dynamic services.

Dynamic Services Framework: an open programming framework for enhancing a relational database Internet platform, such as Oracle8i, for service creation, deployment, access and management. It comprises dynamic service engine, a set of dynamic services, as well as users of dynamic services (service consumer).

Execution Adaptor: a routine that executes a service request in a particular flow. A flow could be as simple as relaying the request to contacting a service provider, or as complicated as relaying a request to a provider and relaying the response to another provider.

Framework: same as Dynamic Services Framework

Input Adaptor: a routine that post-processes the service input from consumers to produce the standard service input that is fed to the underlying service. An example is converting the unit of length from foot to meter.

Output Adaptor: a routine that transforms the raw output from the underlying service to the standard service response.

Protocol Adaptor: a routine that transforms the standard service request to the inputs needed by underlying service following the underlying protocol.

Service: same as Dynamic Service.

Service Consumer: the person who makes use of services in his context, typically some web application developer.

Service Descriptor: a descriptor defining the behavior of a service, containing service provider information, description of service functionality, service management information, service input adaptor, service output adaptor, and other provider-specific sections, such as secure access, caching parameters, etc.

Service Engine: same as Dynamic Service Engine

Service Engine Administrator: the person who perform administrative activities for the engine, e.g., enabling/disabling of services, tuning caching parameters of a service, etc.

Service Handle: a service handle is a logical representation of a service. In practice it is an in-memory structure that is used to create requests, send requests and fetch responses for the service consumer.

Service Invocation: a programmatic request for a service. After having retrieved a service handle, a service consumer can use that handle to make service requests. This invocation process is analogous to making method calls on an object. The life-cycle of an invocation starts when the request is made and ends when a response is returned to the consumer.

Service Provider: the person/organization that provides a service, typically the owner of some data resource or process, e.g., the owner of a currency exchange rate web site.

Service Registration: registration is the process of entering the service package into the Services Registry. This action is performed by the Service Administrator upon receiving a service package from the Service Provider and augmenting it by exercising deployment decisions.

1.2 System Overview

The general makeup of a preferred embodiment of the invention is shown in FIG. 1 of the drawings. As shown, the system operates under the programmatic control of application programs called Service Consumers (SC) which are executed on behalf of system clients as seen at 117. The application programs utilize access components 130 to send requests to and receive information from a Dynamic Services Engine (DSE) 113 which is connected via the Internet 114 to selected Service Providers (SC) indicated generally at 115. The application program utilizes the information thus obtained to provide value-added information to the end users (clients) 117.

In accordance with an important feature of the invention, before any of the Service Providers 115 are accessed by the DSE 113, Service Definition data called a Service Definition (SD) which describes each Service Provider is first stored in a specification database called the Services Registry (SR) 121 using a registration procedure indicated at 111. The registration procedure 111 supplies a Service Definition for a given service provider in the form of a service Descriptor document expressed in Extensible Markup Language (XML) as indicated at 125. The individual elements of each XML service Descriptor document 125 are mapped onto a predetermined service description schema in the specification database 121.

The database 121 is preferably a relational database which forms part of an integrated database system, such as the Oracle 8i System marketed by Oracle Corporation, Redwood Shores, Calif. 94065, a comprehensive platform for building and deploying Internet and enterprise applications. The Oracle 8i platform provides numerous features which can be used to advantage by program developers for developing robust application programs which can also make use of the diverse database resources provided by the present invention. These program development features include:

a. iFS, the Internet File System, which provides an Internet based file system where the "files" are stored and managed by the database.
b. interMedia, which facilitates the management of multimedia data, including text, graphics, video and audio files;
c. Oracle Enterprise Manager, which provides database and environment management user interfaces;
d. Oracle Web Application Server, which facilitates the development of web-based applications,
e. WebDB, an HTML-based development tool for building web content from the Oracle database using web browsers to develop and build dynamic Web applications which employ data stored completely in the database with no additional Web servers; and
f. a Java Virtual Machine integrated directly into the database engine.

The Java Virtual Machine, which forms part of the same machine environment used to execute the Dynamic Services Engine 113 and the functions of the database 121, is used to execute the translators, seen at 127 in FIG. 1 and discussed in more detail later. Each of the translators 127 preferably takes the form of a Java jar file supplied by the implementor to convert data in special formats from particular ones of the service providers 115 into a standard form which may be processed by other components of the system. Similarly, the Service Consumer application program 117 can take the form of a Java program which executes within the Java Virtual Machine, and functions which are performed by the Dynamic Services Engine 113 can be implemented with Java programs executed by the same Java VM.

Dynamic Service Framework advantageously exploits a number of additional mechanisms which are provided by the Oracle8I RDBMS. Framework leverages those technologies and offers its services on top of them:

Oracle Jserver: The Dynamic Services Engine may be deployed as Java components running on the Oracle JServer JVM.

Oracle Internet Directory (OID): This LDAP directory service may be used by the Registries of the Dynamic Services Framework. This includes the Services Registry, the User Registry and their relationships for handling Access Control.

Oracle Advanced Queuing (AQ): Oracle AQ may be used as the underlying system for the communication between the DSE and its clients.

Oracle Advanced Security: Oracle Enterprise Security Manager is an administration tool that provides a graphical user interface to manage enterprise users, enterprise domains, databases, and enterprise roles that are held in a directory server. Once the consumer has logged in, he/she is free to access any secured service provider which he/she has registered before.

It should be noted that communications facilities other than the Internet 114 illustrated in FIG. 1 can be used to provide the communications links which couple the service providers 115 to the Dynamic Services Engine 113 and to the Service Consumer application programs 117. Similarly, data transmission facilities other than the Internet can be used to provide the communication links which couple client machines to the services provided by the system. These other communications facilities include leased line connections, mobile phone links, and anything else that can communicate with the host system (e.g. Oracle 8i) via HTTP, IIOP, SQL*NET, Mobile Gateways, and the like.

1.2 Service Definition Database

As contemplated by the invention, diverse external resources are made accessible to application programs by access mechanisms which utilize Service Definition data stored in the database 121. The Service Definition which describes each of the resources provided by the service providers 115 is used to expose that resource to application programs as a standardized service.

Program developers who wish to use a particular resource, such as an Internet web site, to provide information to one or more application programs, or a service provider who desires to make a resource generally available to program developers and users, follows a standard registration procedure, indicated at 111 in FIG. 1, to create and store the Service Definition data that the Dynamic Services Engine requires to provide access to that resource.

As contemplated by the invention, the Service Definition is preferably provided to the system as a service definition XML document 125. XML possesses a number of desirable features which make it particularly well suited for the expression of Service Definition data, including the existence of tools for creating and testing the syntax and validity of the specification data to be submitted. An XML schema, such as an XML DTD, may be used to specify the required and optional elements which should be present in each Service Definition. Tools constructed in accordance with the Document Object Module (DOM) standard may be used to provide an application programming interface (API) for the XML Service Descriptor documents. Standard XML editing tools may be used to prepare the XML data in compliance with a Service Definition schema, allowing the resulting data to be directly mapped into a corresponding schema used by the relational database 121 which is then accessed in the conventional way by the Dynamic Services Engine 113 or by an application program which can make use of the specification data.

The XML Service Descriptor document 125, and the corresponding data as stored in the specification database 121, may contains the following kinds of information:

1. Company Information: this information is use to identify the service provider and includes information to locate and contact the service provider (typically a company or individual) directly by mail, phone, email, company URL or other contact information. If the service provider's logo is to be used in connection with the service, that logo is specified.

2. Business Information: This section contains information regarding fees to use the services, license keys, etc, allowing the automation of business transactions for each service provider. The information available can be used to build different pricing models, e.g. pay-per-use, block license fees, free use with associated advertising, etc.

3. Security Information: Security information regarding each service permits the Dynamic Services Engine to perform security functions, either as built-in routines or as provided by others, to authenticate users, validate transactions, encrypt messages, etc.

4. Inputs: each Service Definition includes a list of inputs required to execute the service. At the time the service is executed, a request for each of the specified inputs is automatically presented to the user application program in an appropriate format in each user environment. This mechanism allows the services engine to separate functionality from the presentation, a key to providing the same service on different platforms. As part of the input, a user can also provide default values for each or all of the inputs. The default values could be a presented to the user as a list from which users can select a value. An input may simply a URI to point the Dynamic Services Engine to a particular service provider together a filename or method name to access the resource. In the common Internet scenario, an input specification could take the form of a specific URL with a specified GET or PUT method.

5. Outputs: Because the Dynamic Services Engine attempts to present heterogeneous services in a homogeneous environment, the list of outputs to be presented to the users as a result of service execution must be provide as part of the service description. If the service does not return data in a well-understood common format, or if the service provider does not wish to expose its standard output to the system, a Java jar file may be specified as part of the output description, with the Java file acting as one of the translators 127 seen in FIG. 1 to implement a standard interface specified for use by the dynamic services system. When such a resource is accessed, the services engine 113 identifies the jar file from the database 121 and uses the selected Java translator 127 to provide the desired interface to the specific service provider resource 115. When the particular resource at 115 is accessed, the service engine 113 only processes those outputs which are specified in the outputs section of the Service Definition for that resource.

6. Contact Information. Contact information from the service descriptor is used to send a message to the owner or manager of the service provider which does not properly respond to a service request. This notification message may take several forms, including email, a pre-recorded or synthesized voice message to a designated phone number, a fax transmission, a pager message, etc.

7. Update Information. The services engine will periodically search for updated service information from time to time at a location or locations specified in the Service Definition, which also specifies the frequency with which the update check is to be performed. Optionally, a user or service provider can send a message to the service engine after an update is completed, or can post a new location specification from which further updates will be provided.

8. Automatic Test Information: the Service Definition includes fixed input and output values which may be used to test the operation of a specified service. In this way, a malfunctioning service provider can be distinguished from failures caused by communication delays or the like. Automatic tests using this information can be performed periodically to help ensure system integrity, and can also be performed after updates or refresh operations to ensure proper operation of each service.

9. Caching Information. This section of the service description captures the service driven caching parameters. Items in this section instruct the services engine to use or not use cache memory for a particular operation, and inform the engine how long he cached data should be retained and when it should be considered to be expired. When services are known to present static data which changes only infrequently, requesting retention of fetched data in the cache can both reduce network traffic and provide faster service.

10. Additional Information. Beside the classes of information noted above, additional information may be stored in the specification database for each service provider resource, including usage log data, information to be presented back to the service provider for its use, or information used to customize or tune a particular service.

1.3 The Dynamic Services Engine

Figure 2:
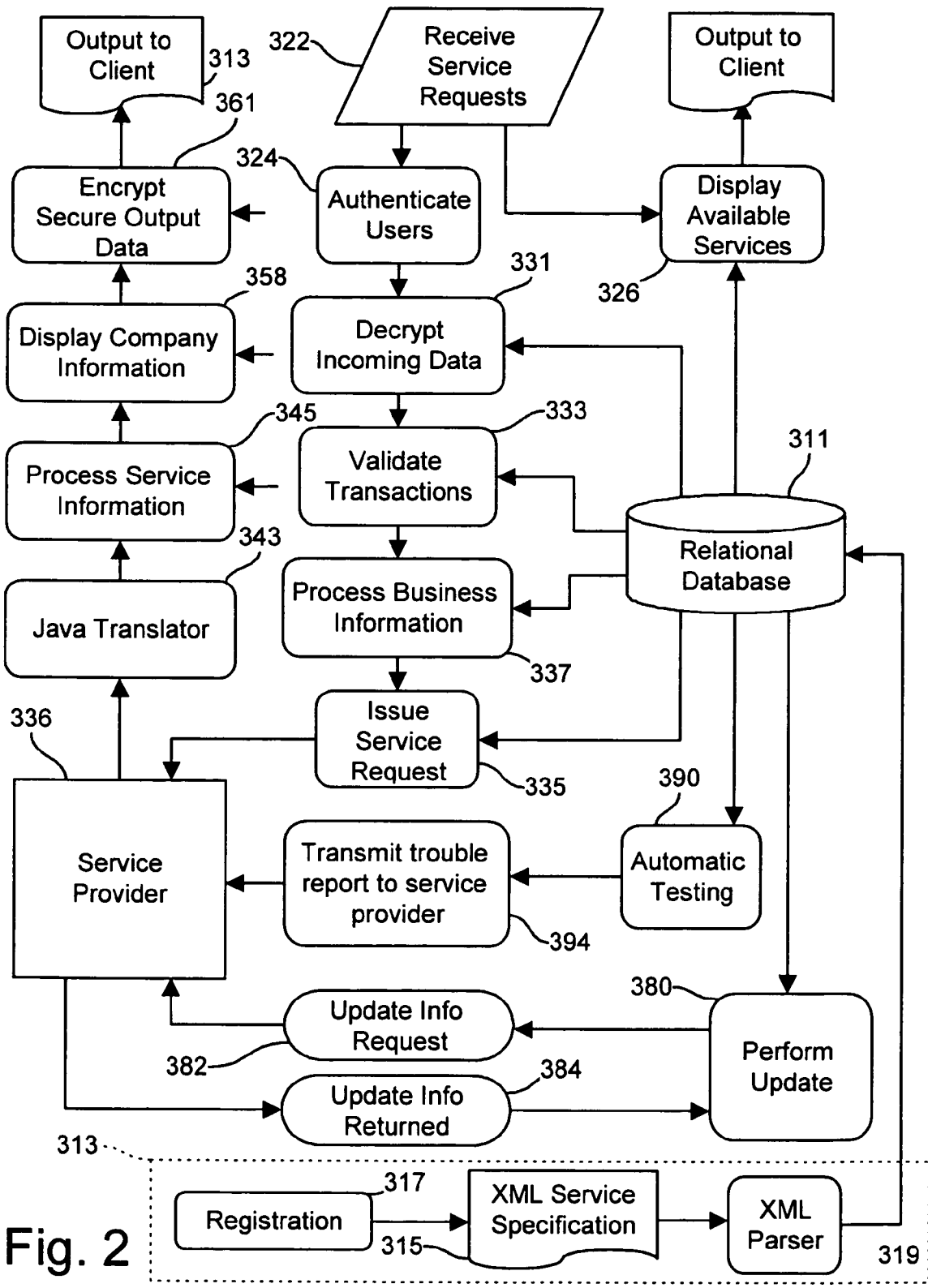
FIG. 2 is a data flow diagram which illustrates an embodiment of the present invention.

FIG. 2 of the drawings illustrates the operation of the Dynamic Services Engine, shown at 113 in FIG. 1, in more detail.

As noted above, before the services engine can process requests for services, each available resource is first described in an XML Service Definition which is translated and stored in the Service Definition database, shown 311 in FIG. 2. All Service Definitions stored in the database 311 are structured in accordance with a predetermined database schema.

The Dynamic Services Engine includes a generic registration module seen within the dotted rectangle 313. The registration module accepts an XML Service Descriptor document 315 from an available source, such as an XML editor, a web application that processes POST data from an HTML form, or any other suitable source as indicated at 317.

The XML Service Descriptor document 315 preferably identifies a standard XML schema which specifies the required and optional elements to be included in the XML Service Definition. An example DTD which specifies illustrative XML schema for the Service Definition elements is set forth at the beginning of the accompanying appendix, and is followed by listings for a set of illustrative Service Definition XML documents which comply with the schema.

The form and function of XML an XML schema data is defined in a formal specification, REC-xml-19980210, Extensible Markup language (XML) 1.0, issued by the Word Wide Web Consortium, the current version of which (issued on Feb. 10, 1998) is available on the Web at http://www.w3.org/TR/REC-xml. As stated in that document, the Extensible Markup Language, abbreviated XML, describes a class of data objects called XML documents and partially describes the behavior of computer programs which process them. XML is an application profile or restricted form of SGML, the Standard Generalized Markup Language [ISO8879]. By construction, XML documents are conforming SGML documents.

XML documents are made up of storage units called entities, which contain either parsed or unparsed data. Parsed data is made up of characters, some of which form character data, and some of which form markup. Markup encodes a description of the document's storage layout and logical structure. XML provides a mechanism to impose constraints on the storage layout and logical structure. A software module called an XML processor is used to read XML documents and provide access to their content and structure. It is assumed that an XML processor is doing its work on behalf of another module, called the application. The XML specification noted above describes the required behavior of an XML processor in terms of how it must read XML data and the information it must provide to the application.

A second specification, also developed by the World Wide Web Consortium, REC-DOM-Level-1-19981001, Document Object Model (DOM) Level 1 Specification Version 1.0, available on the Web at http://www.w3.org/TR/WD-DOM-19980318, defines the Document Object Model Level 1, a platform- and language-neutral interface that allows programs and scripts to dynamically access and update the content, structure and style of documents. As stated in the DOM recommendation, the Document Object Model provides a standard set of objects for representing HTML and XML documents, a standard model of how these objects can be combined, and a standard interface for accessing and manipulating them. Vendors can support the DOM as an interface to their proprietary data structures and APIs, and content authors can write to the standard DOM interfaces rather than product-specific APIs, thus increasing interoperability on the Web.

As seen in FIG. 2 at 319, each XML Service Descriptor document 315 is parsed into its constituent data elements and those data elements are then mapped into and stored in the database 311 in accordance with the standard Service Definition schema. Numerous XML parsers, including the XML parser which forms part of the Oracle 8i platform, can be employed to process the XML document. The Oracle Internet Platform includes built-in XML-support for exchanging XML data over the Internet using the W3C standard, and includes an XML Parser for Java, an XML Class Generator, and an XML Parser for PL/SQL. The Oracle XML parser for Java can be executed by Oracle 8i's Java VM, and enables parsing of XML documents through either SAX or DOM interfaces using a validating mode for testing each incoming Service Definition against the Service Definition DTD. When it is necessary of desirable to alter or update an existing Service Definition, a revised XML document is supplied via the registration module 313.

When an available resource has been registered with the dynamic services system, all or part of the information or processing services which are available from that resource can be programatically accessed by an application program which issues a service request. When a service request is received, the Dynamic Services Engine processes the request against security information stored in the database 311 to authenticate the user and validate the request as indicated at 324.

By accessing service description data in the database 311, the services engine can respond to generic requests by displaying a list of available services. In addition, by accessing the inputs specification for a selected service, the input data required by that service can be presented to users in a manner which is appropriate to that service in different environments. At the time the service is executed, a request for each of the specified inputs is automatically presented to the user application program in an appropriate way in each user environment. This mechanism allows the services engine to separate the functionality from the presentation, a key to providing the same service on different platforms. As part of the input, a user can also provide default values for each or all of the inputs. The default values could be a presented to the user as a list from which users can select a value. An input may simply a URI to point the Dynamic Services Engine to a particular service provider and a filename or method to access the resource. In the common Internet scenario, an input specification could take the form of a specific URL with a GET or PUT method.

Figure 3:
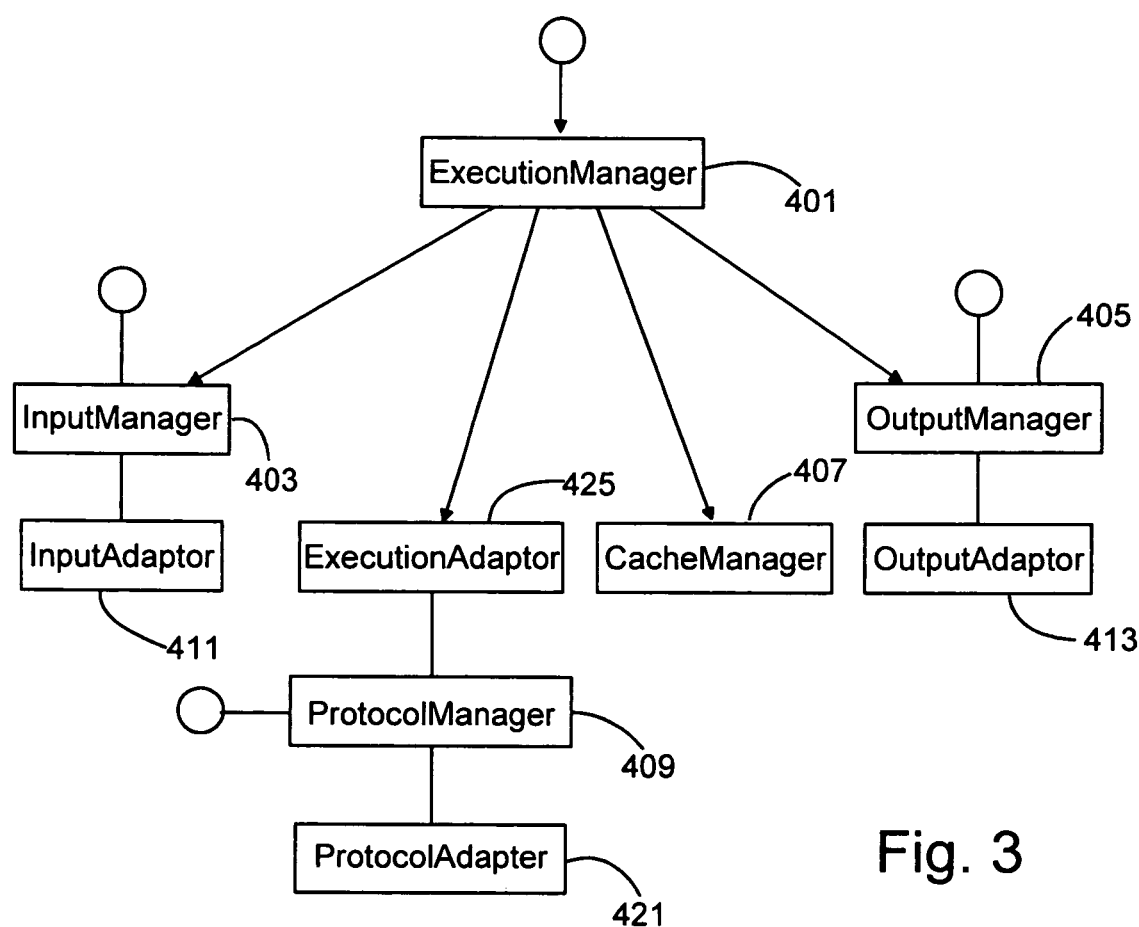
FIG. 3 is a chart depicting the principal class structures used to implement the preferred embodiment of the invention.

If encryption is specified for incoming messages or input data by the Service Definition, decryption is performed as indicated at 331 in FIG. 3. Likewise, the content of incoming messages or input data can be validated as specified by the Service Definition as illustrated at 333. Next, as seen at 337, before the service request is executed accounting functions can be performed in accordance with the business information portion of the Service Definition. Finally, when these steps are completed, a service request is transmitted to a service provider 336, a resource specified in the Service Definition as indicated at 335. As noted earlier, this service request can take the form for an HTTP message to a particular URL and method, passing input data to the resource in the manner specified the inputs portion of the Service Definition.

The service provider (typically a remote web site) returns output data to the Dynamic Services Engine as seen at 340. If the data returned by the service provider 336 is not already in a standard form, the Service Definition of that resource identifies a Java jar file which is executed as indicated at 343 to translate the data from the provider 336 into the desired standard format.

The output data from then is then formatted for presentation use by the client application program as indicated at 345. The output data is published for use by the requesting application in an output format specified in the output section of the Service Definition. If so specified in the Service Definition, company information and/or a company logo can be added to the output data from the service provider as seen at 358, and the data may be encrypted as seen at 361 before being sent to the requesting application program as indicated at 363.

The client application program commonly takes the form of a Java program which executes within the same environment as the Dynamic Services Engine and performs specific operations on the data. The dynamic services infrastructure may be used to particular advantage to integrate data from several different resources into a single presentation to an ultimate user. By way of example, an application can obtain data from a plurality of different registered online retail sites, perform price comparisons, and present the results to a user. A second application could obtain foreign currency exchange rate information from one web site, and obtain price information on stocks or products from other web sites, and present results in a particular currency selected by a user. In each case, the application program can present data integrated in this fashion in ways that are compatible with any device that can connect to the service, such as Personal Data Assistants (PDA's), web servers, mobile phones, and the like.

As indicated earlier, the Service Definition includes contact information which allows the system to periodically issue requests to update the Service Definition data. The person or entity to whom the update request is sent, together with the frequency with which the update requests should be issued, are recorded in the specification data for each resource. Typically, the service provider is contacted as shown at 380 and 382 and, thereafter, the service provider or other person to whom the update request is sent, may respond by submitting new information through the registration mechanism as seen at 484 to modify the Service Definition data in the database 311.

As indicated at 390, test information stored for each service is employed to periodically test the external resource, typically by transmitting standard input data and then comparing the response to standard test output data. If the test reveals a problem, an error report can be sent to a destination address, such as an appropriate person in charge of the service provider, to inform that person of the problem as indicated at 394.

To improve system performance and reduce network traffic, caching information may be stored for each service which indicates the extent to which output data from the service should be cached, and how long cached data should be retained.

Preferably, means are included for recording the nature of transactions performed by the system in a log file, and to record feedback from both client applications and from end users regarding the system, its use, and its performance. Processing means may be incorporated into the system for analyzing both the performance history and the feedback received in order to provide quantitative parameters and descriptive data which describe the performance of the system.

1. Design Features

The principal architectural features of the specific dynamic services framework contemplated by the invention may be individually summarized as follows:

Service Consumer (SC). Service Consumers are clients of the service engine. Through the Dynamic Services client APIs they will acquire handles on the Services, submit service execution requests and collect the responses. SCs are unaware of the communication protocol used by the Dynamic Services client library and the Dynamic Services Engine. Such communication is abstracted by the client library.

Dynamic Services Engine (DSE). The core of the Dynamic Services Framework. The DSE is operates within and uses the services of a relational database system, such as Oracle 8i. Upon Service Consumer request submission, it will execute the service, package the response, and return it to SCs.

DS Services Registry (SR). The Services Registry is the placeholder for the service definitions. Service Consumers can use the client library to query the DSE for lookup operations on the Services Registry.

DS User Registry (UR). Registry for the Service Consumers of the Dynamic Services Engine. It is used for authenticating Service Consumers during their connection phase. It is used for the storage of user properties and information.

Service Provider (SP). They are responsible for defining and providing a service. DSE will contact them during service execution accordingly to the specification provided in their service definition.

DS Administrator (DSA). The administrator is responsible for maintaining the Dynamic Services Registry. His responsibilities include: registration/unregistration/updates of Services, deployment options for services, controlling services access to the Service Consumers, engine performance monitoring, log reviewing, service scheduling, etc.

Communication between DSE and SCs. The Client Library will be responsible for handling the communication between the Service Consumers and the DSE. The communication will be based on messages.

Communication between DSE and DSAs. Service Administrator will be interfacing to the engines through the Administrator Tools. The Tools will be using an extended version of the client library to communicate with the Dynamic Services Engine.

2. Service Definition

A service is defined by all the components that make up the service. They include descriptions of the service in terms of its value-added functionality, declaration of what interfaces it has, information regarding the providing party, and some auxiliary libraries, which may be used during service execution. More concretely, this is referred to as the service package. The Service Provider builds this package and hands it off to the Service Administrator, who will augment it before preceding with the registration, with information that is deployment specific. The Service Provider will not need to take these deployment decisions as he builds his initial package; he merely specifies suggestions on these deployment decisions.

2.1. Service Definition: from the Service Provider

From a service provider's point of view, a service is modeled through an XML document called service descriptor, which provides a centralized source of description for the service. An example Service Descriptor for a Currency Exchange Service can be found in part B of the Appendix.

A service is defined by a multitude of logical components, all of which are specified in the service descriptor, at least in part, if not specified in other documents that the descriptor refers to. There are two sections of the descriptor, one focusing on the higher level descriptions of the service, known as the service header, and another delving on the details of implementations of the service, known as the service body.

2.1.1. Service Header

The service header contains high-level descriptions of the service. For the most part, information specified here is descriptive and non-interpretive for browsing and documentation purpose. The exceptions are service interface specification and service identifier.

2.1.1.1. Naming Specification

Naming information contains a globally unique identifier as well as short and long descriptions of what the service does. Each service will be addressed through an absolute name specified using the URN (Universal Resource Naming) conventions. Universal Resource Naming is described in detail in the Internet Request For Comment document IETF RFC 2141. UUID used by ICE was considered as an alternative.

2.1.1.2. Version Specification

The service header includes version information with pointers on how and where the service update is to be performed. Coupled with support contacts from the service provider Information section, this bit of information is critical for service maintenance.

2.1.1.3. Service Provider Information

High-level information about the service provider can be specified, including the provider's company name, copyright information, and company URL. Detailed information drills down further into contacts for support and URLs for logos. This information is provided in the form of an X-Link that will point to another XML document. In order to make use of this XML Document, the Dynamic Services Engine has to be aware of the semantic mapping between the XML Schema that it follows and the internal storage structure inside the registry. There will be an initial set of schemas that the engine will semantically understand. In the future, plugging in additional parsers for new schemas can augment this set. This allows the Dynamic Services Framework to embrace emerging standards for representing data such as company information/contacts that will have been heavily used in existing applications.

2.1.1.4. Deployment Specification

Optionally, specified in the descriptor is a set of deployment properties comprised of suggestions from the service provider to aid the service engine administrator during registration time. They include classification guidelines with hierarchical categories as well as flat keywords, and recommendations of caching parameters. This information is also provided in the form of an X-Link that will point to another XML Document specifying the classification schemes. Again, this is to allow for existing or emerging standards on schemas that data used for categorization will adhere to. The values specified in this section are only suggestions to a service administrator during service registration. The values stored in the Services Registry could be different from the values specified in the descriptor. Note that in other sections, certain parameters can be specified to be deployment options so that the administrator can set them up appropriately at registration time.

2.1.1.5. Service Interface Specification

The Service Header allows for the definition of an interface characterized by the schema specifications of its input, output, and exceptions. The specifications can be dispersed in external XML-Schema documents or they can be embedded in the Service Descriptor. The location of the XML-Schemas is specified by URLs: when a relative URL is used, that is relative to the service package submitted by the service providers. Absolute URL can be used to address XML-Schemas stored on external registries or repositories (e.g. integration with the OASIS registry). The DSE may also retrieve input/output XML Schemas from external registries such as xml.org. It should be also be able to insert/update/delete XML Schemas at external registries on behalf of the user. By specifying these schemas, the service provider enforces the syntax in which consumers send requests to it, as well as the way in which it provides the responses. The validation will be done in the Service Engine when a consumer sends a request, before the actual service provider is contacted.

The service provider can also suggest a name for the interface, which is a deployment option and can be overwritten by the service administrator. Any new service that conforms to the same service interface must provide the same input/output/exception definition. The engine will also expose to consumers the capability to search for services by interface. Two services that conform to the same interface are considered compatible services, a concept useful for fail over.

To facilitate the development of code that will work with the Dynamic Services Framework, class generators can be used to create Java classes that map to the request/response XML-Schemas. A Java class generator may be provided as part of the client toolkit: it will be able to fetch the schema from the service engine and generate appropriate classes for easy manipulation on the client side.

2.1.2. Service Body

The Service Body contains more detailed descriptions for each one of the components in the Dynamic Services Engine (DSE) that will be employed at execution time. Specifically, it is sectioned into details on the input, protocol, execution, exception, and output. The service provider can specify an adaptor that needs to be used at each level, be it supplied by the engine or the provider. The functionality of each adaptor will be discussed in each of the following sections. In addition to the adaptors, other service specific parameters may also be specified.

2.1.2.1. Input Specifications

The input section specifies the list of necessary as well as optional processing on the request that comes in from the consumer.

2.1.2.2. Input: Rendering Directives

Under normal execution flow, the request XML that the consumer submits or sends to the service engine will be validated with the Input XML-Schema that is specified previously in the header. However, the DSF allows a service provider to optionally supply some form of Schema Mapping specifications (e.g. through XSL Transformation) that could map this Input XML-Schema to a presentation form such as HTML or WML (Wireless Markup Language). As a result, the consumer can easily provide to its clients (remember that our consumers are application developers) a way to input service requests, for applications that have an HTML or WML interface.

Notice that the engine is not responsible for the rendering: all that the engine is responsible for is the capabilities to store and retrieve the mapping. The engine only provides the mapping(s) of the transformation. The actual transformation is done on the consumer side by the client toolkit. If we have a mapping of the schema into an HTML form, the consumer can use the mapping to render the Input schema to an HTML form for his web application. He can then transform the HTTP Requests back to an XML document, which conforms to the XML-Schema specified by the service provider. Finally, the request XML will be sent to the service engine formulating a service request.

2.1.2.3. Input: Default Value and Aliases Directives

Service providers may specify additional directives for the purposes of:

1) Default value: Filling in a default value for these parameters into the request XML for which the consumer specified no values. Service providers can also specify that the default value for those parameter must be validated at service deployment time. For example, for HTTP, specifying a XPath into the request XML addressing an element that represents one of the HTTP request parameters to be sent to the HTTP server.

The directive can also provide mapping to the parameters that are not defined by the request XML schema, e.g., some HTML form hidden parameters. In this case, a value has to be specified.

In both cases, the value to be filled-in can be a user profile property fetched dynamically at runtime for each user. This information is opaque to the registration parser: The administrator will be prompted to enter a mapping through some API calls to the engine at deployment.

2.1.2.4. Input: Input Adaptor

The input adaptor section is an optional section, identifying an adaptor that further processes the service request before sending to the service provider. Examples of such processing include semantic or higher level validation of the request. This input adaptor specification is a fully qualified name of the class that will handle the processing. Such class will be either found in the service package given by the service provider during registration.

The service provider has the option of specifying some adaptor specific parameters in the PARAMETERS element under the adaptor, which is validated at service registration time and interpreted at runtime by the input adaptor. These parameters are opaque to the Service Descriptor parser and Services Registry.

2.1.2.5. Protocol Specifications

The protocol section identifies the way that service engine accesses the underlying service. For example, a service may be accessed via HTTP protocol while another service may be accessed via JDBC protocol. This protocol adaptor specification is a fully qualified name of the class that will handle the communication to the underlying service. Such class will be either found in the service package given by the service provider during registration or in the set of libraries that the service engine provides.

The service provider has the option of specifying some adaptor specific parameters in the PARAMETERS element under the adaptor, which is validated at service registration time and interpreted at runtime by the adaptor. For example, for HTTP, it may specify the HTTP method used and the URL that does the actual servicing. These parameters are opaque to the Service Descriptor parser and Services Registry.

Usually, service providers will choose to use protocol adaptors that have been pre-packaged with the engine, like generic adaptors for HTTP and an Oracle JDBC adaptor.

2.1.2.6. Execution Specifications

The execution section identifies the way in which the service is to be executed. Its responsibility is to take in the request XML and return the response from the underlying service provider. Execution adaptors can be standard simple adaptors that follow the simple path described above. They can also be complex adaptors that aggregate several services like in the International Portfolio example. This execution adaptor specification is a fully qualified class name of a class that will perform the execution. Such class will be either found in the service package given by the service provider during registration or in the set of libraries that the service engine provides.

The service provider has the option of specifying some adaptor specific parameters in the PARAMETERS element under the adaptor, which is validated at service registration time and interpreted at runtime by the execution adaptor. These parameters are opaque to the Service Descriptor parser and Services Registry.

The result of the execution adaptor is the response given back from the service. If the service is a simple service, the response will be in the native format of the service provider. For example, for a web-based service, the response may be in HTML format, and for database service, the response would be a java.sql.ResultSet object. If the service is a compound service, the response will be a structured service response.

Usually, if the service is a simple service, a service provider will use pre-packaged simple adaptor. If the service is a compound service or a simple service that has non-standard execution flow, the service provider will provide a custom execution adaptor.

2.1.2.7. Exception Specifications

The exception section identifies the way in which the exceptions are to be handled for this particular service. Output Specifications The output section specifies the list of necessary as well as optional processing to produce the response to the consumer.

2.1.2.8. Output: Output Adaptor

The output section identifies the way in which the output returning from the execution adaptor is to be formatted in the way prescribed by the Output XML-Schema. This output adaptor specification is a fully qualified name of the class that will handle the transformation. Such class will be either found in the service package given by the service provider during registration or in the set of libraries that the service engine provides.

The service provider has the option of specifying some adaptor specific parameters in the PARAMETERS element under the adaptor, which is validated at service registration time and interpreted at runtime by the adaptor. These parameters are opaque to the Service Descriptor parser and Services Registry.

Usually, for simple services, service providers will either use the pre-packaged adaptors such as XML Adaptor and JDBC ResultSet Adaptor, or they will provide custom adaptors. For compound services, service providers will use a NULL Adaptor since the response from the execution adaptor will often be in the proper format prescribed by the Output XML-Schema.

2.1.2.9. Output: Rendering Directives

As far as the service execution flow is concerned, output section is the final stop. However, additional mechanisms are provided for the service provider to optionally specify mappings (e.g. in the form of XSL Transforms) that will map this response XML to other forms such as HTML or WML. Consumers, rather than service engines, are responsible to make use of the transformation to render the desirable output.

Service Definition: from the Service Administrator

Service providers will package their service definitions in to a service package: as said before a service package contains a service descriptor, the XML-Schemas or their locations, and optionally a set of Java class files. It is then responsibility of the Service Administrator to take the service package and register it to the Dynamic Services Engine instance he is managing. During such registration, he will be assisted by the Dynamic Services Administration Tools.

During registration, information found in the descriptor and all other sources that it refers to will be used to create a logical representation of the service in the Services Registry. Such a process will involve an interaction with the Service Administration who will be asked to specify the value for the service deployment parameters. Deployment parameters are defined as parameters that are specific to the deployment of a service within a Dynamic Services Engine instance. They include:

a. Naming and classification of a service. The category under which the service should be registered as well.

b. Deployment input values: the values for some of the service request parameters that have been tagged as deployment time inputs by the service provider. Such feature can be used to model a business relationship where the service provider publishes a service that accepts a username/password and license key as inputs. At the deployment time, the Service Administrator establishes a business relationship with the service provider and acquires the username/password and license key to be used within his Dynamic Services Engine.

c. Caching policies: Strategies employed by the service engine administrator possibly include basic scheduling, pre-fetch, cache on request, and MRU/LRU cache replacement considerations in cases where cache resources allocated are limited.

d. Check for updates and service regression. A frequency to be used for checking if new versions of the service packages have been made available by the service provider or if the service is unavailable.

e. Fail Over: Create through the Dynamic Services Administrator Tools a Fail Over Service for such service under registration f. Others: other parameters include logging.

After registration/deployment, these decisions taken by the Service Administrator will be materialized and stored in the Services Registry. As a result, when the service is exported from one service engine to another, the information contained in the exported service descriptor will include the deployment choices made by the original administrator; hence the properties found will be a superset of those found in the original service descriptor. A Service Administrator XML schema can be used to validate an exported service descriptor XML document.

3. DSE Execution 3.1.1. Introduction—Component Layout

The Dynamic Services Engine (DSE) is the core of the Dynamic Services Framework. In the preferred embodiment, DSE is deployed as a Java component running on the Oracle JServer. The main responsibilities of the DSE are to collect requests for a service execution from the service consumers (DSE-clients) communication sub-system, and relay the requests to the DSE execution sub system, which processes them according to the service specifications and returns the built response to the SCs through the same communication path.

The discussion to follow will focus on the DSE execution sub-system, detailing the internals of the DSE Execution sub-system from the service execution prospective. This section will first present a decomposition of the DSE execution into smaller components and it will then continue showing how they interact during a service execution. The specific details of each component will be finally presented.

3.1.2. Component Overview

FIG. 3 of the drawings shows a high-level overview of the internal components of the Dynamic Services Engine execution sub-system—a conceptual class-diagram is used for such representation. The engine has been decomposed into several components each of them addressing one of the sub-systems necessary for the service execution.

In general, Managers as those components whose functionality is service-independent. Managers are responsible for performing tasks that are common across services and which cannot be parameterized by the service provider during their service definition process. The Managers shown in FIG. 3 include the Execution Manager 401, an Input Manager 403, an Output Manager 405, a Cache Manager 407 and a Protocol Manager 409.

Unlike Managers, Adaptors are components that are service-specific. For a given service, the Adaptors to be invoked during the service execution are specified by the service provider during the service definition process. Input and Output Adaptors shown at 411 and 413 are responsible for service-specific processing of the service requests and responses. Protocol Adaptors as illustrated at 421 offer an abstraction over the communication protocol between the DSE and the service provider. For each Adaptor, service providers will be able to specify Adaptor-specific parameters in the XML service descriptor. These parameters can be accessed by the Adaptor implementation during service execution. They can be seen as Adaptor configuration parameters. Default adaptors can be provided for standard behaviors and a set of commonly used adaptors are also be provided, such as an XSL Input Adaptor, and HTTP Protocol Adaptor, and an HTML Output Adaptor.

Since adaptors are the components that can be implemented by a service provider to extend the engine, they pose security risks to the engine. Hence, all adaptor interfaces should have restricted access of resources to the engine.

3.1.3. Implementation Approach

Each of the components shown in the component view should be modeled into Java interfaces. Adaptors supplied by service providers should realize the appropriate Adaptor interface (e.g. a YahooStockQuoteOutputAdaptor should implement the OutputAdaptor interface). For each of the Managers, an interface is defined: such interface exposes the Manager functionality, on which other components within the DSE depend. For example, a Manager defined by the AbcManager interface, is associated to a class called DSEAbcManager which will provide an implementation for those tasks 3.2. Simple Service Execution Illustrations The ExecutionManager seen at 401 plays the role of being the coordinator during the service execution. For a given request, it will first ask the InputManager 403 to process it. The latter, after performing an initial processing, will forward the request to the appropriate InputAdaptor 411 for further service-specific processing. The processed request is then handed-off to the ExecutionAdaptor seen at 425 that will perform the service execution. This step includes using the ProtocolManager/ProtocolAdaptor pair 409/411 to marshal the request into the form required by the underlying communication protocol between the DSE and the service provider. Additional service-specific logic can be embedded in the ExecutionAdaptor 425 implementation. The raw response returned by the service provider is processed by the OutputManager/OutputAdaptor pair 405/413 and then finally returned to the service consumer.

3.3. InputManager/DSEInputManager (IM)

3.3.1. Code Layering/System Services

InputManager 403 is the first step in the service execution flow coordinated by the ExecutionManager. It is responsible for the processing of a service request. Such processing is available for all services and is meant to be service-independent. Responsibilities of the InputManager 403 include: optional request validation (based on user request), handling default values, hidden values, defining aliases addressing specific part of a service request, and finally invoking the InputAdaptor for service-specific processing.

3.3.2. Concepts

Each service specifies the XML-Schema to be used to compile service requests. Every service request is a XML document compliant with such supplied schema. InputManager 403 processes request XML documents and, if necessary, make modifications to them. The input of InputManager 403 is an XML document representing a service request compliant to the service request XML-Schema. Its output does not necessarily need to be compliant with the input XML schema. It is a choice left to the InputAdaptor to process the input request and to notify the InputManager 403 if such processing altered the structure of the input in a form that makes it not compliant to the schema. In the case of a schema-compliant transformation by the InputAdaptor 411, the InputManager 403 will revalidate the processed request before moving to the next execution steps.

The responsibilities of the InputManager 403 are:

3.3.2.1. Handling Default Values

Service providers can also associate a default value to a given Xpath. For a given request, InputManager will check if the entities addressed by the Xpath have a value specified. For those XPaths that do not have consumer-supplied values, InputManager should use the specified default value and add it to the request. For a given Xpath, it is possible for the service provider to supply a set of default values. For each of these values a new element will be appended to the XML request document if no consumer-supplied value is found. InputManager will not handle default value options that are specified for Xpaths referring to container elements. Such construct can be used for handling parameters that are optional for the service consumer but required by the service provider.

ProtocolAdaptor will use this facility of InputManager to adapt the service request to the specific needs of the communication protocol used by the service provider.

3.3.2.2. Optional Request Validation

For a supplied request, InputManager 403 will optionally validate the syntax of the service request to check its compliance to relative input XML-Schema. Such processing will happen after the default value processing described above.

3.3.2.3. Invoking InputAdaptor

For service-specific request processing, InputManager 403 is responsible to create an instance of the appropriate InputAdaptor 411 and invoke its process method. Such processing should happen after the default-values processing. InputManager 403 is also responsible for re-validating the request syntax after the InputAdaptor processing. This validation is conditional on the nature of the transformation applied by the InputAdaptor.

3.3.2.4. Aliases

A service descriptor can also specify aliases for given XPaths in the service request. For a request processed by the InputAdaptor 411, the Xpath refers to the processed request XML document and not the original service request. The entities addressed by those Xpaths are considered can then be addressed through the aliases. Other components, including execution adaptor and protocol adaptors, can then retrieve the values of these entities using the aliases.

For Xpaths referring to elements in the XML tree that are not leaves (e.g. a set of elements of the same type, or container elements) it is up to the users of the aliases to apply the appropriate logic for handling their values.

Handling Hidden Parameters

A service definition can contain the specification of hidden request parameters. Those are defined as aliases, which are not associated to any Xpath in the request. For each of these hidden parameters a value has to be specified. This construct is used for parameters that should be hidden to the service consumers and which, therefore, cannot be part of the service request.

Usage Scenarios

Aliases are particularly useful to model the inputs of HTML forms. For example, a HTTPProtocolAdaptor will use this facility of InputManager to map and flatten a service request into an query string (of content type application/x-www-form-urlencoded).

In general, aliases are useful to flatten a hierarchical XML-based service request to a flat list of parameters required by some protocols, such as query string of the type application/x-www-form-urlencoded and JDBC statement binding parameters.

3.3.3. Architecture

The InputManager interface defines all the APIs that are exposed to other components within the DSE. The DSEInputManager class will implement the interface and provide additional interfaces used only internally by itself.

3.3.4. Data Structures

The Input Manager's DSEInputManager interface works on the XML-documents representing service requests. DSEInputManager will use the standard Document Object Model (DOM) APIs for its operations.

3.4. InputAdaptor (IA)

3.4.1. Code Layering/System Services

InputAdaptor 411 is responsible for processing of a service request from a service-dependent point of view. Service providers can provide a class implementing the InputAdaptor interface and associate it to their service. During execution InputManager 411 will create an instance for the supplied InputAdaptor and invoke its process method.

3.4.2. Concepts

InputAdaptors are optional for a service. If specified, they can process request XML documents and, if necessary, make modifications. The input of InputManager is an XML document representing a service request compliant to the service request XML-Schema. Its output does not necessarily need to be compliant with the input XML schema. InputAdaptor should notify the InputManager if their transformation results in a XML document that is not compliant to the service request XML-Schema.

In addition, DSE includes with standard configurable InputAdaptors that can be reused by service providers:

3.4.2.1. XSLTInputAdaptor

An XSLTInputAdaptor will transform a service request according to a supplied XSLT transformation. This InputAdaptor will be configurable through Adaptor XML-parameter specifying the XSLT transformation to be applied.

3.4.3. Architecture

The InputAdaptor interface defines the interfaces that service providers have to implement when defining a custom service request processing logic.

3.5. ExecutionManager (EM)

3.5.1. Code Layering/System Services

The ExecutionManager 401 is responsible for the coordinating the service execution flow. It sits in the middle of DSE components and coordinates among them for completing the service execution process. A new instance of the ExecutionManager is created at the beginning of each service execution. ExecutionManager is supposed to be stateless with respect to service executions. A new instance of ExecutionManager will be created by the consumer request handler every time a new request is posted.

Notice that an ExecutionManager only handles one service request. Concurrent service requests by concurrent users and concurrent service requests by one user is discussed in later in connection with Communications of DSE to External Entities.

3.5.2. Concepts

The ExecutionManager orchestrates the service execution among other DSE components. The input of the ExecutionManager is a processed service request while its output is a service response. The steps taken by the ExecutionManager 401 during the service execution are:

3.5.2.1. InputManager

For a supplied request, ExecutionManager 401 will first forward the request to the InputManager 403 for additional processing.

3.5.2.2. ExecutionAdaptor

In the second step, the processed request is forwarded to the ExecutionAdaptor 425. Its responsibility is to get the request and optionally interact with the ProtocolManager 409. Additional service-dependent logic can be implemented in the ExecutionAdaptor 425.

3.5.2.3. OutputManager

The raw response returned by the service provider is then fed to the OutputManager 405 which will structure it accordingly to the response structure defined in the service descriptor.

3.5.2.4. CacheManager

Another responsibility of ExecutionManager 401 is the coordination of service response caching through the Cache Manager 407. That implies that the ExecutionManager 401 is responsible check for the availability of cached service responses before executing a service. If such response is available, no service will be executed and the cached response will be returned to the client. The caching of the output response will be achieved through the services of the CacheManager 407. On a principle level, ExecutionManager 401 will asked CacheManager 407 to cache the services response by storing it into a map using the request as a key. The visibility of the cached response and its lifetime will be specified by the Service Administrator on a service base. Additionally the lifetime can be specified by the Service Provider on a request-base through an expiration date model.

3.5.2.5. Architecture

The ExecutionManager interface collects all the APIs that are exposed to other components within the DSE. The DSE-ExecutionManager class will implement such interface and provide additional interfaces used only internally to itself.

3.6. Execution Adaptor 3.6.1. Code Layering/System Services

The ExecutionAdaptor 425 is responsible for encapsulating the service-dependent behavior of a service execution. For a given service, its ExecutionAdaptor is specified in the service descriptor. Service providers can provide a class implementing the ExecutionAdaptor interface and associate it to their service. There can be only one ExecutionAdaptor for each service. The ExecutionAdaptor 425 is instantiated by the ExecutionManager 401, which then delegates to it the responsibility of interacting with the ProtocolManager for reformatting the service request into a form suitable for the remote service provider.

3.6.2. Concepts

ExecutionAdaptor 425 is a key component in the DSE framework as it has the ability of associating a complex behavior to a service execution. For example, ExecutionAdaptor 425 can be used to build compound services and encapsulate them into a single service. ExecutionAdaptor can also be used to define the logic for handling failover behavior where, if a service fails during its execution, a "compatible" back-up service can be invoked. ExecutionAdaptor 425 is the layer of the DSE offering service execution flexibility. The input of the ExecutionAdaptor is a service request while its output can be some response which will be further processed by OutputManager, or can be a structured service response.

For a given service, the service provider can build a specific ExecutionAdaptor. Through a set of APIs, ExecutionAdaptors will be able to access Adaptor parameters specified in the service descriptor. Through this facility, service providers have the option of building general purpose ExecutionAdaptors that are configurable through XML parameters in the service descriptor. In addition, DSE will ship with some pre-built ExecutionAdaptors and it will also provide a set of tools to facilitate the creation of new ExecutionAdaptors. Each of the above options is described in details in the next sections.

3.6.2.1. Simple ExecutionAdaptor

A simple ExecutionAdaptor is provided as a component of the DSE engine. It can be considered as a default Adaptor used by the ExecutionManager when no service-dependent Adaptor is specified. Its responsibility is limited to the interaction with the ProtocolManager for the correct service execution.

3.6.2.2. ExecutionAdaptors for Compound Services

Compound services are defined as added-value services built on-top of other services. In general, their execution implies the execution of a set of services—which can happen in parallel mode, serial mode or in a mixture of the two—plus some additional processing/transformation on the requests/responses of the dependent services. DSE will support Compound Services through its ExecutionAdaptor layer. Developers of the ExecutionAdaptor will have access to the ServiceRegistry and will therefore be able to create the Service instances that they are dependent on. For each of these services they will be able to pipeline the output of one service into input of another one, maybe after doing some processing on it. They will have full flexibility in defining the logic of their Compound Service given the fact that ExecutionAdaptor are Java-based components.

Tools Integration. To reduce the ramp-up time for service providers who wants to develop their ExecutionAdaptor, a set of tools may be provided with the DynamicServiceFramework. These tools enable a build process for Compound Service driven from a Graphical User Interface (GUI). From those tools, service providers should be able to specify:

A. An execution flow for those services that they are building on top of, specifying their order of execution and the degree of parallel execution to be used (within the limitation of JServer); and B. Additional logic to connect those service together. This will be achieved through Java code snippets specified in the tools and then used by ExecutionAdaptor. Those snippets will offer full flexibility for the service providers to build any arbitrarily complex connecting logic for their services.

Tools have the responsibility of collecting the information above and generate the Java code of an ExecutionAdaptor from there. The tools will assist the providers who want to provide compound services such as comparison services and federated search services.

3.6.2.3. Authentication to Service Providers

ExecutionAdaptors are responsible of authenticating to the service providers. The actual authentication procedure is service-specific. ExecutionAdaptors will also rely on ProtocolAdaptors 421 if the authentication is dependent on the protocol, e.g., JDBC.

3.6.2.4. FailOver

One of the functional requirements for the Dynamic Service Framework is the ability for service administrators to specify a list of back-up services to be executed if a service fails. The back-up services should be compatible with the original service—meaning that their input/output interfaces should be compliant to the same pair of XML-Schemas. When the execution of a service fails, the FailOver Adaptor (not shown) will also notify the administrator.

The flexibility offered by the ExecutionAdaptor layer fits perfectly for modeling such behavior. Service administrator can build a new service out of a set of compatible services and specify the preferred priority order for their execution. An ExecutionAdaptor will then try to execute the first one, if it fails, move to the next one, and so on.

Tools should also be able to facilitate the processing of creating of such a service. Tools should allow service administrators to create such a failover service through simple graphical interfaces.

3.6.2.5. Configurable ExecutionAdaptors

ExecutionAdaptor developers are also given an additional level of flexibility. A section in the service descriptor is dedicated to ExecutionAdaptor parameters. Those XML-based parameters can be used to build a general-purpose ExecutionAdaptor that can be shared among several services. In fact, by using these parameters the ExecutionAdaptor can be configured according to the needs of each of the services.

An interesting application of this facility would be to build a generic ExecutionAdaptor whose logic can be supplied through a JavaScript-like language as a one of its XML-based parameters. Through this option, developers would have access to all the syntax exposed through the scripting language used, thus having the possibility of expressing complex logic in a natural way.

3.6.3. Architecture

From architecture prospective, ExecutionAdaptors are just defined by an interface. The DSE may be supplied with a simple implementation of the interface while most of the complex ExecutionAdaptors will be generated to meet special needs. In addition, the ExecutionAdaptor interface defines the interfaces that service providers have to implement when defining a custom service execution flow.

3.7. ProtocolManager (PM)

3.7.1. Code Layering/System Services

ProtocolManager 409 is responsible for handling ProtocolAdaptors. Its main function is to act as factory class for ProtocolAdaptors upon requests from the ExecutionAdaptor 425. ExecutionManager 401 creates the ProtocolManager 409 and then passes it to the ExecutionAdaptor 425.

3.7.2. Concepts

ProtocolManager 409 is organized as the factory class for ProtocolAdaptors. For a given service, it will instantiate the ProtocolAdaptor required by the supplied service. The input of the ProtocolManager is a service request while its output is a raw service response.

3.7.3. Architecture

The ProtocolManager interface collects all the APIs that are exposed to other components within the DSE. The DSEProtocolManager interface class implements such an interface and provides additional interfaces used only internally to this component.

3.8. ProtocolAdaptor (PA)

3.8.1. Code Layering/System Services

ProtocolAdaptors seen at 421 are low-level components abstracting the DSE engine from the communication protocol imposed by service providers thus creating an insulation layer between the DSE and the service provider. For a given service, its ProtocolAdaptor is specified in the service descriptor. There can only be one ProtocolAdaptor for each service. Service providers can provide a class implementing the ProtocolAdaptor interface and associate it to their service The ProtocolAdaptor is instantiated by the ProtocolManager.

3.8.2. Concepts

ProtocolAdaptor 421 offers an abstraction on the communication protocol imposed by service providers. The input of the ProtocolAdaptor is service request. This request is the outcome of the processing performed by the InputManager modules. The output of the ProtocolAdaptor is a general Java object encapsulating the raw response returned by the service provider. Such response will be finally processed by the OutputManager so that it will become compliant to the response XML-schema specified in the service descriptor.

ProtocolAdaptor have the following responsibilities:

3.8.2.1. Parameter Bindings

ProtocolAdaptors should be able to bind a service request to the set of parameters expected by the service provider communication protocol. Such binding may require a transformation of the service request structure—which has been designed to be service-independent—into a form that is protocol-specific.

For example, a service accepting an HTTP POST request will expect to have its input parameters specified using the conventional HTTP syntax: param1=value1¶m2=value2. However, a service request, being represented through a XML document, can have a complex structure. It is the responsibility of the ProtocolAdaptor to "flatten" such request in an HTTP query string representation (of content type application/x-www-form-urlencoded). As described in Section 3.3.2.1 and 0, this can be achieved through the InputManager's aliases.

A similar example is how ProtocolAdaptor can be used for the bind-parameters in SQL-based services. A service request can specify the values of the parameter, while a ProtocolAdaptor parameter in the service descriptor can be used to specify the query to be issued. ProtocolAdaptor can then create a SQL statement using the Adaptor parameter, bind the request parameters into the statement and finally execute the query.

3.8.2.2. Authentication to Service Providers

Protocol Adaptors must be able to authenticate to service providers. The authentication can be an implicit authentication (automatic authentication upon request from the provider) or explicit authentication (the user of a ProtocolAdaptor issues an explicit authentication request).

3.8.2.3. Request Execution

After the parameters binding, ProtocolAdaptor will open a "connection" to the service provider and simply submit the request in the appropriate form. If the submission is synchronous in nature then the ProtocolAdaptor will wait till the response comes back.

3.8.2.4. Raw Response

The ProtocolAdaptor is responsible for "getting" a handle on the raw response returned by the service provider in the native format of the service provider. Such a "raw" response will be modeled as a general java.lang.Object because the format of the response depends on the native format used by the service provider. The format of this object is known by the OutputAdaptor, which will be then process it by casting it to the appropriate class (e.g. InputStream for HTTP-based services or ResultSet for Database services).

Compound Services might not have a ProtocolAdaptor specified as they rely on the ProtocolAdaptors of their underlying services. DSE is preferably provided with two standard ProtocolAdaptors, HTTPProtocolAdaptor and OraProtocolAdaptor, that can configured and reused by service providers.

3.8.2.5. HTTPProtocolAdaptor

The HTTPProtocolAdaptor will handle the communication between the DSE and service providers using HTTP protocol. Its Adaptor parameters will include the URL to be used, the HTTP method and other HTTP specific parameters.

HTTPS protocol support may also be provided.

3.8.2.6. OraProtocolAdaptor

The OraProtocolAdaptor will handle the communication for those services that publish information stored in Oracle databases. Its Adaptor parameters will include connection parameters such as SID and username/password as well as the SQL statement and its type to be used for accessing the information 3.8.2.7. Other Standard Adaptors Other adaptors which could be provided as standard components include those supporting LDAP, SMTP/IMAP, SOAP, ICE, BizTalk, etc.

3.8.3. Architecture

From an architectural prospective, ProtocolAdaptors are defined by an interface. The DSE is preferably provided with standard ProtocolAdaptor implementations for the HTTP protocol and the Oracle database access. As mentioned those Adaptors will be configurable through the XML-based Adaptor parameters specified in the service descriptor 3.9. OutputManager (OM)

3.9.1. Code Layering/System Services

OutputManager 405 is the responsible for handling OutputAdaptors. Its main function is to act as factory class for OutputAdaptors and to coordinate the communication between the ExecutionManager and the OutputAdaptor. The ExecutionManager creates the OutputManager and then calls it after the ExecutionAdaptor has completed its processing.

3.9.2. Concepts

OutputManager 405 may be organized as factory class for OutputAdaptors 413. For a given service, it will instantiate the OutputAdaptor 413 required by the supplied service. The input for the OutputManager is the raw response returned by the service provider. The OutputManager will forward that raw response to the OutputAdaptor, which will use it to build a ServiceResponse compliant to the response XML-schema specified in the service descriptor. It is the responsibility of the OutputManager to validate the response returned by the OutputAdaptor to check that its syntax is compliant with that XML-schema. Such validation is optional and controlled by the OutputAdaptor.

3.9.3. Architecture

The OutputManager interface collects all the APIs that are exposed to other components within the DSE. The DSEOutputManager implements such an interface and provides additional interfaces used only internally to this component.

3.10. OutputAdaptor (OA)

3.10.1. Code Layering/System Services

OutputAdaptor 413 is responsible for transforming the raw response returned by the service provider into the ServiceResponse structure. Such structure is defined in the response XML-schema specified in the service descriptor. OutputAdaptor are service-specific as they carry the knowledge of how the raw service response is structured (both syntactically and semantically). Service providers can provide a class implementing the OutputAdaptor interface and associate it to their services. OutputAdaptors are instantiated by the OutputManager, which will then forward to them the transform call for output transformation.

3.10.2. Concepts

The responsibility of OutputAdaptors is the transformation from the raw service response in the native format of the service provider to the standard service response defined by the output XML-Schema. For example, a web-based service may need an OutputAdaptor to transform the raw service response in HTML to an XML response conformed to the output XML-Schema defined by the service. A ServiceProvider has the choice of building a custom OutputAdaptor for their services and specifies it in the service descriptor. For compound services in that the outcome of the Execution-Adaptor may be already formatted correctly, the default NULL OutputAdaptor can be used.

The DSE preferably is provided with three configurable OutputAdaptors that can be reused by service providers:

3.10.2.1. HTMLOutputAdaptor

HTMLOutputAdaptor will handle raw responses that are HTML formatted. It is responsibility of this OutputAdaptor to parse and scrape the HTML page for extracting useful content from it and package it in an XML response. There are currently two design options for this component. The first option is to build an HTMLOutputAdaptor that is configurable through the Adaptors XML-parameters. The other option is to delegate to the Tools the responsibility of generating the Java code for specialized HTMLOutputAdaptor for each given service.

3.10.2.2. XMLOutputAdaptor

XMLOutputAdaptor will handle raw responses that are XML formatted. This OutputAdaptor may be configured through the Adaptor XML-parameter specifying an XSLT transformation. This transformation will be applied to the raw response to adapt it to the response XML-schema.

3.10.2.3. OraOutputAdaptor

SQLOutputAdaptor will handle ResultSet returned from the execution of SQL statements. The design of this Output-Adaptor is similar to the XMLOutputAdaptor. An Adaptor XML-parameter may be used to specify an XSQL transformation to model the ResultSet into a XML document compliant to the response XML-schema.

3.10.2.4. Others

Other standard OutputAdaptors can be provided, such as an LDAPOutputAdaptor.

3.10.3. Architecture

From an architectural prospective, OutputAdaptors are defined by an interface.

4. SR Components 4.1. Functional Overview

Services Registry, which forms part of the specification database shown at 121 in FIG. 1, stores and manages all the services in a service engine. It provides facilities for registering a service, unregistering it, modifying it, and searching the registry for a set of services satisfying a given criteria. From a Service administration point of view, other requirements are:

a. When a service is being updated, any service invocation of the same or dependent services has to be invalidated.

b. Ability to register/unregister/update a set of services as a single transaction is desirable.

c. Dependency tracking in service unregistration is desirable for compound services.

d. Access control is preferably enforced by the registry. The Service Administrator should be able to decide whether a service can be accessible by consumers or not. For example, he can choose to expose the generic stock quote service to some consumers, but keeps Yahoo stock quote nor Bloomberg stock quote services inaccessible from any consumer. In addition, the access control mechanism should provide role-based access control for different service consumers.

Facilities for bulk loading are also desirable, but only to a limited extent due to the size of the registry which is sized to anticipate at most on the order of thousands of services.

4.1.1. Code Layering/System Services/Paths

From an architecture perspective, the Services Registry is an independent component, shared by one or more service execution engines. In addition to services, the specification database 121 also manages user profiles, which are described later. An execution engine logically accesses the registry whenever service information is needed. However, in practice most of the service access may be provided by the Services Registry cache at the execution engine. The architecture provides flexibility in scaling the service engine to a large amount of users (potentially geographically distributed) by simply adding additional service execution engines. The runtime performance of service access, on the other hand, will be satisfied by the cache.

The Services Registry exposes these features for any components that need to access some information about a service. For example, ExecutionManager will need to obtain the default values to preprocess the input request; client library will need to access the registry to lookup services. Any implementation details should be hidden and completely controlled by the registry module.

4.2. Component Description

The central registry is preferably implemented using an LDAP directory, such as the Oracle Internet Directory (OID). See generally, *LDAP: Programming Directory-Enabled Applications with Lightweight Directory Access Protocol* by Tim Howes and Mark Smith, ISBN 1-57870-0000-0 (Macmillan Technical Publishing—1997). An LDAP directory has the following advantages over a conventional database for this -application:

A. The LDAP directory based approach provides an open-standard based solution, increasing the appeal of the overall system.

B. Existing users in a corporate LDAP directory can be reused.

C. LDAP directory is optimized for read access by various applications in an organization, which fits our usage scenario.

This section starts with discussing individual components, assuming caching does not exist. Finally, it discusses the service cache and its impact to the other components.

4.2.1. Service Modeling

A service consists of a set of attributes, reflected by a service descriptor; a set of Java classes and dependent resources for various adaptors; reference to input and output schemas; and Service deployment parameters. The entire service may be stored in the LDAP directory (directory).

The service descriptor is modeled by an objectClass (called orclDService for the rest of this document), which consists of a flat list of attributes. A instance of a service descriptor will then be realized as an entry in the directory that inherits from orclDService.

The structure of the service descriptor is hierarchical while the structure of an objectClass is flat. Hence, the descriptor is flattened in the orclDService.

Some attributes of the descriptor are composite and multi-valued in nature. For example, a descriptor can have multiple Input default value and alias elements. Each entry element consists of path, alias and default value. Such an attribute can only modeled by an opaque string. Multiple such opaque strings can be stored in an entry because an LDAP attribute can be multi-valued. An alternative can be having multiple sub entries.

Input and Output schemas can again be modeled by an objectClass. Each schema may be realized as an entry in the directory that inherits from the objectClass. The objectClass may consist of an attribute that stores the identifier of the schema, an attribute storing the schema (in textual XML or some binary representation of the XML such as serialized Java DOM object), and possibly additional metadata.

Similarly, the set of Java classes and resources, represented by a Jar file, can be stored modeled by an objectClass. The binaries can be stored in a binary opaque attribute. The only metadata that needs to be stored is the name of the Jar file.

4.2.2. Services Registry Structure

Service descriptors are stored hierarchically, according to the categorization of the services defined by service administrators. As a result, each category may be modeled as an entry, consisting of the name of the category, additional descriptions and possibly other metadata. The root of the entire service descriptor tree may be defined by the service administrator.

Input/output schemas may be stored directly under schema sub-tree of the directory. There is no additional hierarchy needed. Java classes Jars may be done in a similar fashion.

4.2.3. Service Access: Administration

Service registration and unregistration is equivalent to adding and removing an entry to the directory. Service update is equivalent to modifying attributes of an entry.

Transaction control is not specified by LDAP standard although OID guarantees that each modifying operation is atomic. However, registering/unregistering/updating a set of related services in a transaction is not possible with OID. Instead, service access administration logic enforces the transaction.

4.2.4. Access Control

Access control is enforced the registry logic by rewriting the access query to a string by adding additional constraints based on access control information.

The model is straightforward: A service consumer can either have the rights or not have the rights to access a service: listable in lookups, readable, and executable. Any more granular access is not necessary for the registry. Service Only administrators have the rights to register/unregister/update services.

Based on the model, the access control can be subdivided into two sub problems:

a. Service Administrators should be able to grant accessibility for a particular service to all the consumers. This can be achieved through the addition of an additional boolean attribute toConsumer which is set to true only for a service that can be exposed to the consumers. The access control is then be enforced by the service engine logic with an additional filter of (toConsumer=true).

b. Role-based access control for different service consumers.

Based on the roles of a consumer, the consumer can access some subsets of the services. For example, a policy can be specified such that stockquote service is available to consumers with the role BUSINESS. This can be achieved through maintaining access control list in the user profile registry (Refer to Section 0 for more information) and enforcing the ACL by rewriting the service lookup.

Furthermore, access control can also be granted/revoked on categories rather than individual services. For example, the service administrator should be able to allow only consumers with role A to access to all services under business: finance. However, category-based access control less important because of the limited size of the registry and the limited number of users of the service engine (a service consumer represents an application, rather than end users).

4.2.5. Service Cache

The service cache is a specific cache provider of the representing the Services Registry.

The service cache is used by the service access APIs. Service access components will first attempt to read the information from the cache through a query-rewrite layer to rewrite the query in the service cache form. If the information is not in the cache, the service access components will then read the information from the registries. In practice, to improve performance and avoid complication in accessing Java classes, the service cache may cache the entire Services Registry.

Physically, service caches may be implemented as database tables, sitting in the same database as the service execution engine. The service descriptor subtree is represented by a descriptor table and a category table. The input/output schema subtree may be represented by a schema table. The Java classes Jars sub-tree is represented by the class tables of JServer.

The lifetime of the cache is the lifetime of the service engine. When a service engine starts up, it populates the service cache (a prefetch operation using the terminology of the CacheManager). The service cache stays alive until the engine is shutdown. When there are updates occurred in the registry, an agent in the registry invalidates the old cache entries and populate the new entries to all affected service caches in all service execution engines.

5. UPR Components

5.1. Introduction

The user profile registry is responsible for collecting information that is relative to the Dynamic Service Consumers. Service Consumers are defined as applications accessing the Dynamic Service Engine, therefore authenticating themselves to the engine. End users are to be considered as the users of the application built leveraging on Dynamic Services. Applications using Dynamic Services authenticate themselves to the Dynamic Services engine. For example. an application may authenticate itself to the Engine using a SC1/SC1 (ServiceConsumer1/ServiceConsumer1) username/password. At the same time, the Application may have its own clients, and it is the application's responsibility to manager those clients. The user profile registry is used to store information belonging to the SC1 user.

5.2. Service Consumers Authentication

Applications acting as Service Consumers authenticate to the Dynamic Service Engine to access and execute Services. For such purpose, Dynamic Services Framework may take advantage of the RDBMS authentication facilities. Through the APIs in the client library, Service Consumers will implicitly open a database connection to the Service Engine. The username and password to be supplied at connection opening will be agreed between the Service Administrator and the application developer. Service Administrator can also set service access control policies to be associated to each service consumers. Such policies will also be stored in the User Profile Registry.

5.3. User Profile Information

There are three types of information and attributes that can be associated to the user profile registry:

1) DSE-private, meaning information that is shared across users. This is modeled through deployment service input parameters. An example of this would a service, which exposes the same username and password for all the Service Consumers of a Dynamic Services Engine.

2) User-private, meaning information that is likely to be valid for the entire life-cycle of the user. For example, let's imagine a service which wants to differentiate the service consumers using different user username/password for each of them.

3) Connection-private. For example dynamic cookies that are sent to the user during the service execution (e.g. to identify a shopping cart session).

The User Profile Registry stores and manages user-private information only. Examples of this information include the username and password with respect to a specific service. The UserProfile Registry offers to Service Consumers facilities to store properties that are dependent on their clients, thus facilitating the management and mapping of application clients.

5.3.1. Notes on Connection-Private Information

An example of Connection-private information is the HTTP cookies used by web sites for session management. The User Profile Registry does not manage dynamic session information such as HTTP cookies. Instead, such information will be returned to Service Consumers in the form of a Service Response header. Note that the User Profile registry and the Service Engine are stateless compared to the service execution.

5.4. Architecture

The UserProfile Registry may be implemented as an LDAP directory which is the preferred mechanism to archive in a central repository the user information and share it across Dynamic Services Engine instances. Therefore even user credentials will be centrally managed in directory. The access performance may be improved by using caching on the Dynamic Service Engine. Clients will access the cached User Profiles reducing the number of access to the registry. The user profile registry provides the following interfaces:
  a. PropertyValue getPropertyValue(ServiceConsumer username, service name, application criteria, property name)
  b. setPropertyValue(ServiceConsumer username, service name, application criteria, property name, property value)

We can notice that application code can specify additional optional criteria when storing and retrieving user profile parameters. This facility is particularly useful for managing attributes of application clients within the registry.

5.4.1. Notes on Scalability

The architecture proposed is particularly well designed for scalability with respect to increasing number of users. In fact, Service Consumers can authenticate to the Service Engine and then establish a connection pool. The scalability of this connection path is directly related to the scalability of Oracle8i with respect of the number of client connections. In addition, through the facilities provided by the User Profile Registry and exploiting the fact that the Engine is stateless, applications can use any connection in the pool with any of their client requests. In fact, the architecture does NOT impose any one-to-one relationship between the application clients and the Service Consumers.

5.5. Authentication to Service Providers

Three different scenarios can be used to perform authentication. In the first, the user's credentials are passed as part of the service request. In the second, all consumers for an engine may share the same credentials, which are stored as parameters of the service. In the third case, which is likely to be used the most, each consumer has his own credentials which are accessed through the User Profile Registry.

6. Communications of DSE to External Entities

This chapter details the communication between a service engine and an external entity. In general, there are two types of external entities: the application logic of a service consumer, which needs to connect to a service engine, lookup a service, and execute a service; and the application logic of the tools for service administrators, which needs to perform additional administrative tasks such as registration and unregistration of services.

All these external entities communicate to service engines using service engine client library. Since there are two types of external entities, there are two client libraries: service consumer client library and service administrator client library. The two client libraries, however, share the same common foundation to communicate with a service engine.

This chapter starts with a description of the architecture of the communication between a service engine and client library common foundation. It then lists out the operations exposed by service consumer client library, followed by the listing of operations exposed by service administrator client library. After that, client library is discussed. Finally, future extensions and alternatives that have been discarded are present.

6.1. Communication Between DSE and Client Library Common Foundation 6.1.1. Code Layering/System Services/Paths The communication between a service engine and a client library common foundation is the interface exposed by the service engine to the outside world: External entities like service consumer application logic communicates with service engines using the appropriate client library, which in turn relies on the common foundation. Through the communication interface, service engine accepts requests and invokes appropriate components such as execution manager.

6.1.2. Requirements

The communication interface must provide the infrastructure to enable the two different client libraries exposing the operations needed respectively; allow asynchronous communication so that calls to the engine will not block the caller; and maintain the scalability and efficiency of the system. Specifically, the service engine has to be scalable with respect to number of connections. What is more, within a connection, concurrency has to be maximized.

6.1.3. Concepts

Service engines communicate with external world through message queues in the engine. When an external entity needs to perform a certain action, for example, executing a service, the client library common foundation will send a correspond message to the request queue. A request handler in the service engine will listen to the queue, fetch the request message, and invoke appropriate engine components, for example, execution manager. When the operation is done, service engine will post the response in the response queue. A listener in the client library common foundation will listen to the response queue, and invoke appropriate callback method.

6.1.3.1. Service Engine Connection Life Cycle

When an external entity connects to a service engine, the client library common foundation opens a connection to the database instance where the service engine resides. The common foundation also performs other initialization: creating a connection to the Oracle Advanced Queuing service, creating the request and responses queues for the connection, setting up the request handler in the engine, and setting up the response listener for the external entity.

With the connection established, the external entity can then perform various operations such as looking up and executing services. The client library common foundation will send a request message to its request queue in the engine. At request submission time, an object identifying the request message will be associated to the message to serve as the request identifier. The external entity receives the response by registering a callback method. In this architecture, client's calls to the engine do not block the client code.

Listening to the request queue, the request handler in the engine will process the request message, and enqueue the response message in the response queue. The request handler is not committed to handle requests concurrently.

The response listener at the external entity side (created at connection initialization time) will receive the responses sent by the engine. Based on the request identifier, the listener will invoke the appropriate callback method. Exceptions are treated as a special type of response: the response listener will be able to throw and create the appropriate exception correspondingly. When an external entity closes a connection to the engine, the client library common foundation closes the database connection The common foundation will also free up other connection-private resources, e.g., queues created and pending request/response messages.

6.1.4. Implementation Approach

The message-based communication is built on top of the relational database queuing mechanism which, in the preferred embodiment, is Oracle Advanced Queuing (AQ) in the Oracle database. The mechanism uses the Java Messaging Service (JMS) interface exposed by AQ wherever applicable, to maximize interoperability. The JMS enqueue interface may be used to enqueue a message for both the clients and the request handlers. Similarly, the JMS MessageListener may be used to receive messages asynchronously.

6.1.4.1. Client-Side

With the AQ-JMS based asynchronous interface, an external entity can send a request without any blocking. All it needs to supply is a callback method. AQ-based JMS MessageListener of the connection (managed by the client library common foundation) is responsible for listening for the response, which does not actively poll the network. The connection-private JMS MessageListener will dispatch the response to the appropriate callback method based on the request identifier.

6.1.4.2. Server-Side

Similarly, the request handler in the engine is created as a JMS MessageListener, a static Java object in the connection's private Java Virtual Machine. It has to be static in order to receive any request in the lifetime of the connection.

For each submitted request, a new thread will be created to handle it. In such a thread, a new instance of the ExecutionManager will coordinate the execution. Different requests made in a connection will thus be served by different threads.

However, since service execution runs in Oracle JServer, which does not provide preemptive threads. The request handler will not be able to handle requests truly concurrently. As a result, while client's call is non-blocking and truly asynchronous, requests in the engine will be handled with only limited concurrency: When a service execution thread is idle in socket calls, another execution thread will be activated. A client can achieve a higher degree of concurrency by using more connections.

In creating a connection to a service engine, a database connection will be obtained. A JMSConnection and a JMSSession will then be created based on the database connection at the client side. Connection-private (conceptually) queues will be created in JMSSession. The request handler in the engine will also be created, based on a JMSConnection/JMSSession created at the server side. All the logic will be captured in a Java Stored Procedure to minimize the complexity of the client library.

6.1.4.3. Scalability and Performance Requirement

The presented architecture satisfies various requirements:

a. Oracle AQ JMS based messaging architecture allows external entities to make calls to the engine without blocking.

b. Connection private request handlers on top of Oracle JServer allows the service engine to leverage Oracle database's scalability with respect to the number of connections.

c. For each connection, connection-private queues rather than sharing some global queues for a few reasons. First, connection private queues can avoid additional unnecessary complexity on selector to pick appropriate messages for a connection in a global queue. Second, it also gives better isolation of a connection from other connection. Finally, the overhead of creating queues is a one-time overhead during initialization for each connection. Typically, a connection is expected to exist for a long time so that the overhead in initialization will be relatively insignificant. See 6.3.2 for alternatives that have been discarded.

d. Non pre-emptive threads used in handling the requests in a connection maximizes the concurrency within the connection. It is anticipated that the common scenario when a thread will be idle is making socket calls. Non preemptive threads provided by JServer provides the appropriate lightweight infrastructure to maximize the concurrency while minimizing the overhead introduced.

6.2. Client Library

The communication interfaces between an engine and an external entity is defined by the client library. Since there are two types of external entities (consumers and administrators), there are two client libraries correspondingly. The interfaces are defined by the interactions listed out in the previous two sections. All complexities of messaging and connection initialization will be hidden from the users of the libraries.

6.3. Miscellaneous

6.3.1. HTTP-Based Communication

JDBC-based communication and AQ/JMS-based communication (which is also based on JDBC Connection) may be used between a client and an engine. An HTTP-based communication can optionally be implemented to facilitate communications through firewalls. The messaging interfaces are AQ/JMS-based, but the AQ/JMS interfaces may be implemented on top of HTTP. The communication that uses JDBC directly may be implemented using HTTP-POST request to Oracle Web Server.

6.3.2. Alternative Realization of Connection-Private Queues

Connection-private request and response queues are again queues in AQ. There are various possible alternatives in realizing them. Broadly speaking, there are two dimensions of parameters:

1. A request queue and a response queue implemented as one physical queue with two selectors: one for the requests and one for the responses, versus each of them implemented as a physical queue.

2. A connection-private queue implemented as a physical queue created for the connection, versus the queue implemented as a global queue (across connections) with a specific selector for the connection.

The possible combination then includes:

a. Each connection-private queue is implemented as a physical queue, created for the connection.

b. Connection-private request and response queues are implemented as one physical queue created for the connection, with two selectors.

c. A connection-private request queue is implemented as a global request queue shared among all connections, with a selector to select messages specifically for the request of the connection. The connection-private response queue may then be implemented similarly.

d. All connection-private queues are implemented by one global queue. Each connection then has two selectors: one selector for selecting request messages of the connection, and one selector for selecting the response messages of the connection.

The request and response queues are preferably implemented using two physical queues private to the connection.

6.3.3. Alternative Architectures

In addition to the messaging-based architecture presented, an EJB-based architecture could be used. All interactions defined by messages can be represented by methods of a set of generic Dynamic Services EJBs. This architecture is less desirable because EJB specification does not provide asynchronous interface infrastructure and does not allow creation of threads either (so asynchronous behavior cannot be achieved by spawning threads in EJB server and returning the result through a callback function). Moreover, a messaging-based architecture permits the definition of a core subset of interfaces as messages. If there is a need to support other protocols between a client and an engine, the message definition provides the common foundation for implementing additional protocols.

7. System Services

This chapter describes a set of high-level services shared and used by various components of the service engine. Some of the services will also be exposed to the users of the engine: service providers, service administrators, and service consumers.

7.1. Session Context

The life-cycle of a Dynamic Service Consumer requires to open a connection to the Dynamic Service Engine at the beginning. Within such connection, Service Consumers can execute multiple services. Each of these services can actually create a session with the remote Service Provider. For example, a service connecting to a web site can receive as part of the response an HTTP cookie that has to be supplied with every following request.

From the point of view of the Dynamic Service Engine, two types of sessions have to be handled. The first one is across service executions and the second is within a service execution.

7.1.1. Session within a Service Execution

When executing a service, the ExecutionAdaptor is responsible for establishing the right execution flow for the service. Let's assume for example that a particular service requires to make a first round-trip to the service provider for authentication purposes and then to perform a second one to actually execute the service. If the communication protocol is HTTP based, the session between the two round-trips will be maintained through the usage of HTTP cookies. The ExecutionAdaptor will collect the cookie returned after the first round trip and then re-use it for the second request.

As shown in the diagram below, ExecutionAdaptors will have access to facilities provided by the Dynamic Service engine to temporarily store session identifiers such as HTTP cookies. The lifetime of this storage will only be within one service execution and therefore will not span across multiple executions.

7.1.2. Sessions Across Service Executions

Dynamic Services Engine will not maintain sessions across Service Executions. Following our example of a Service Provider accessed through the HTTP protocol in a single round-trip, if the service provider returns a cookie, the latter will not be stored or managed by the Service Engine. The cookie, or any other protocol-specific session identifier, will be returned to the ServiceConsumers in the form of a response header. It this way the Service Engine stays state-less with the respect of Service Executions.

7.2. CacheManager (CM)

A Cache Manager is made available within the Dynamic Services Framework. It does not need to have a semantic understanding of what is being cached but must be extensible in order to serve components including the Services Registry, service execution (responses), and even protocol adaptors. The caching for each one of the components is done in a relatively independent manner so that one component's cache will not interfere with another's. With this independence, different life cycles are achieved across different components. Two dimensions determine the life cycles of the caches; application (or module) specific expiration policies and general flushing policies. Currently there are three policies for general cache flushing; connection level caching where everything cached during a connection is flushed when the connection closes, engine level caching where everything cached during an uptime of the engine is flushed when the engine is shut down, and persistent caching where the cache is never flushed. If desired, caches can be purged manually via API calls.

To achieve this extensibility, the Cache Manager should have a plug-in architecture that allows different plug-ins to augment it and allow it to cache for new components. These plug-ins contain the logic for semantically understanding what is being cached as well as the component specific expiration policy that will be enforced.

7.2.1. Code Layering/System Services

The CacheManager is a component that will be shared across components that needs any caching functionalities. It is an extensible component, which can extend its provisions to new components through a plug-in architecture. The plug-ins are in the form of configuration files that contain specifications on information such as expiration policies and general cache flushing policies.

7.2.2. Concepts

Temporal Scoping

CacheManager operates with caching models and supports the models specified in the HTTP/1.1 protocol: Expiration Model and Validation Model—for more details on those policies please refer to the HTTP/1.1 specifications. The validation model corresponds to the general cache flushing policies described above. Service providers will be able to suggest caching policies to be used for their services. This implies that a section in the service descriptor will be dedicated to caching parameters. For example, those parameters can include the specification of an Xpath in the service response addressing the server-specified expiration time for that response.

Spatial Scoping

The visibility of the cache will be determined by the Service Administrator initially during registration time. Later he may alter this visibility by modifying the access control for users/consumers on the underlying storage solutions of the cache depending on the service.

Pre-Fetching

A concept related to caching is pre-fetching. Pre-fetching is a feature controlled by the service administrator rather than service providers. For each service, service administrators can specify a request and an execution time schedule. DSE will follow the supplied schedule to execute the service with the supplied request and then cache its response. Such feature will also have to behave consistently with the caching policy supplied by the service provider. Administrator Tools can help to suggest an optimal pre-fetching policy.

Storage

A hash table like structure which may be implemented a database table may be maintained, where the cached results are hashed with keys that are component specific. For example, a context bundle can be used as a key to hash the service response for a certain service execution.

7.3. Event Manager and Related Services

7.3.1. Concepts

7.3.1.1. Event Manager

The Event Manager is a component that tracks actions taken in the flow of an execution. In essence the engine should be able to make use of all this information for purposes of logging, billing, etc. The model followed should be one where it is possible for components interested in auditing, to add themselves as listeners to the EventManager. Components internal to the DSE will generate the events and post to the EventManager which will dispatch them to the appropriate listeners. Appropriate event classes should be used for each one of these actions. Events generated by the DSE will also contain information about the user that triggered the operation that generated them so that logging and billing logic can be applied on such information.

7.3.1.2. System Event-Based Services

The Event Manager interface exposed would give access to all of the events tracked/saved in a systematic manner. Other modules can be attached to the EventManager to make use of the information tracked by the EventManager. A set of modules providing some system services may be provided:

a. Logging services can re-organize these events in some systematic way for use with other modules or even applications, e.g., third-party log analysis applications, system debugging and profiling report tools, etc.

b. Billing services can use this information to track how much a consumer is using the services and therefore how he is to be billed accordingly. The billing module may provide an API to attach billing applications, e.g., Oracle iPayment, to the service engine.

c. Notification services can notify administrators (or any other relevant personnel) certain system-generated events, e.g., service execution failure. It can provide an API to attach different notification methods, e.g., email, pager, short messaging, Oracle Enterprise Manager, etc.

d. Trigger services allow administrators to execute administrator-defined services upon the occurrence of some events. For example, a user-quota service trigger can be activated before a service is invoked to audit resource allocation. An execution of a trigger is guaranteed to start at the same state as the event that triggers it.

There are two types of triggers: passive triggers do not affect the execution flow of the logic that generates the event. Active triggers, on the other hand, can affect the execution flow of the logic that generates the event, e.g., a user resource auditing trigger can stop the execution of a service if the user has exhausted his quota.

Technically, logging, billing and notification services are simply specific triggers. However, they are defined and provided by the engine while trigger services are services defined by individual administrator for their specific tasks.

7.3.1.3. Event Classes

Different event-consuming modules are interested in different types of events. For example, logging services are generally interested in the all events while billing services are only interested in the service-execution-completion events. Hence, an events will be classified to one or more class(es) by different classification schemes. The classification schemes include:

1. ALL events: all events belong to the ALL event class. Logging services are interested in all events.
2. System-generated vs. user-generated events: The service engine will define and generate a fixed set of events while administrators and service providers can also define and generate other events in their plug-ins to the engine, e.g., a service-specific execution adaptor. Notification services only notify system-generated events.
3. Triggerable events: Some events represents a state that additional triggers can be attached in the execution flow, e.g., user-resource auditing trigger can be attached before the execution of a service. Some other events are purely informational and are not designed to invoke any triggers. Trigger services will only be interested in triggerable events.
4. Profile events are events generated for service execution performance profiling.

Debug events are events generated to produce some system traces for debugging purposes.

7.3.1.4. Extensibility for the Users of the Engine

While a set of system services are the clients of the EventManager, administrators may provide additional event-based services indirectly through defined hooks: Trigger Services and Billing Services. Service Providers, on the other hand, can affect the event system by defining and posting additional events in service-specific adaptors. Service Consumers do not interact with the event system.

7.3.1.5. Implementation Approach

During the regular service execution, components of the Dynamic Services Engine may post events about their operations to the EventManager. In practice, this can be done by having the Event Manager component receiving messages from these internal DSE components through queues.

Components interested in certain events may register themselves to the EventManager and indicate the class of events they are interested in. The communication between the EventManager and the Listeners (e.g. LoggingListener) will be based on a publish-subscribe model based on AQ facility. Each component will run in its own dedicated connection to the engine. In this case, these components will be executed asynchronously.

For components whose logic need to be executed immediately and synchronously upon the generation of an event, e.g., active triggers of the trigger service, they may register themselves as synchronous listener to the EventManager via the same publish-subscribe model. However, internally, they may be invoked synchronously (as opposed to asynchronously via messaging) by the EventManager upon the generation of the applicable events.

8. Common Infrastructure

The following list of components may be shared by all the other components in the service engine.

8.1 Exception Handling

Similar to response handling, error Handling may be performed by queuing and de-queuing error messages using AQ. The conceptual response queue is used for posting the error messages. Each error message is therefore be modeled as a special response message. Error messages materialize in the form of short XML documents whose type is deduced from a set of headers. The client library constructs a Java exception out of the message and return it to the clients.

The error messages meet the following requirements:

1) Error messages reflect the source of the problem. That is, they also return the client-context supplied at request time in a fashion similar to the one discussed in Section 6.1.3.1.

2) Error messages indicate severity; the following are the prescribed levels of severity. The client library will interact with the response queues and upon receiving error messages, package them into Java exceptions are returned them to the clients.
   a. Warning: These error messages serve to warn the consumer that the execution of services following may behave abnormally after the occurrence of the warning.
   b. Error: These are error messages that stop the execution flow of the service.
   c. Fatal Error: They WILL stop execution flow, invalidating the client connection.
3) Error messages set provisions for service providers to embed service specific error details in these error messages. This is a way for service providers to "extend" our error handling mechanism. Such service specific error messages can be raised by the Adaptor's code, where service provider can add additional error condition check. These details can be simple or complex structured XML snippets that will be understandable by both the providers and the consumers.

The following four types of error messages are supported:

Application-to-Application (A2A): This type of error messages is thrown when a service specific error happens. This can take on several forms including but not limited to semantic errors in the request happening on the service provider side or any errors resulting from applying service provider-supplied adaptors.

Application-to-Server (A2S): This type of error messages is thrown usually by the DSE. It entails errors that occurred before going to the service provider. As far as the consumer is concerned, either something went wrong on his side, or on the engine side. This type of errors include syntax errors where the request XML does not conform to the provided Input XML-Schema, as well as the engine's notification of updates letting consumers know that some specific service will be down. Specific cases of Application-to-Server errors are the Administrator related ones. They involve registration errors that could result only from calling the APIs that are accessible to the administrator.

Server-to-DataSource (S2D): This type of error messages is the lowest level of errors. It occurs at the "transport" level when connection problems between the Engine and the service provider are encountered. This entails not only errors like having a proxy that is down, but also "File Not Found Exceptions" on the service provider side.

Alternative Considered

In addition to the Request and Response queues that each consumer owns, an exception queue will be set up called DS Exception Queue, which will be a destination for error messages when they are thrown by the service engine, awaiting pickup by the consumers. Error messages materialize in the form of short XML documents whose type is deduced from a set of headers. If we have a separate queue just for the exception, then error message can be modeled as a unique type of messages. The solution is not desirable because for a submitted request, the client library will have to "monitor" two queues for a possible response. In fact, the response queue will be used if a correct response is returned and the error queue if the request fails. Hence, it is preferable to monitor only ONE queue and have the error message as a special response type.

9. Advanced Features

Multiple Service Execution Engine: To provide additional scalability to a large number of users, a logical service engine can be implemented by a central registry (of users and services) and a set of service execution engines. The system can then be scaled by adding additional service execution engines. The central registry will not become a bottleneck because of the heavy use of caches at the service execution engine. What is more, if the users are geographically distributed, service execution engines can also be added to reduce the network traffic.

Multiple Service Registries: In a distributed environment, the central Services Registry of a service engine can contain reference to services in the central Services Registry of another service engine. To improve performance, a central Services Registry will also cache these external references. This is useful for sharing service definitions among multiple engines. In a large organization, there can be multiple service engines serving different sub-organizations. A service that is primarily owned and managed by a sub-organization (represented by a service engine) can then be re-used by other sub-organizations without requiring the other sub-organizations to duplicate the service (and hence the management of the service).

Service Engine to Service Engine communication: In some B2B exchange or content syndication scenarios, a service engine can be also be a service provider to another service engine (when both parties are using providing their solutions based on Dynamic Services Framework). An optimized ProtocolAdaptor may be implemented to provide a fastpath communication between the two engines, improving the runtime performance of such systems.

Integration with external schema registries: Various efforts are ongoing to provide global XML Schema registries, e.g., xml.org by OASIS and biztalk.org by Microsoft. The Service engine may also allow management of XML schemas via these external registries, including retrieval, insertion, deletion, etc. An API to external schema registries may be defined to allow external schema registries to be plugged-in. When there is a demand for integration with certain external schema registries, a plug-in can thus be provided without affecting the rest of the system.

10. Security

Security consists of following components:
  a. Authentication: For services customer and services provider, authentication insures the Dynamic Services Engine is the entity the customer or provider wants to contact. For the Dynamic Services Engine, authentication means that it is connected to the expected service customer and/or service provider.
  b. Encryption: To secure the confidentiality of the data transmitted via public network.
  c. Integrity: To secure that the data cannot be modified while transmitted via public network.

Access control is closely related to security, which concerns two aspects: the privilege to access a certain database table, or the authority to access, manage or execute the local files in the OS of the Dynamic Services Engine's host. After authentication, the DBMS or the OS knows who is the user. By granting the database privileges or file system authority to this user, the access control can be applied. In other words, for Dynamic Service Engine, access control can be implemented by Oracle DBMS functions, or the host's OS commands. There is no need for Dynamic Service Framework to provide additional access control.

Although a fully-fledged security system consists of three components: authentication, encryption and integrity, for some connections only one or two security features are necessary. For example, if a certain service provider only requires authentication, then the dynamic engine will only have to authenticate itself to the service provider, but it may not encrypt its data to the service provider and it may not ensure the integrity of the transmitted data.

There are many ways to implement the authentication, encryption and integrity. Dynamic Service Framework preferably offers two security features, (1) conventional login name/password method for authentication, (2) Secure Socket Layer (SSL) for authentication, encryption and integrity.

The function libraries of Oracle Net8 and Oracle Advanced Security Option (ASO) offer Java APIs for the variety of encryption algorithms, certificate management, and SSL handshake etc. Other security options, like Kerberos authentication, may be used as well.

There are two kinds of connections in the Dynamic Services Framework, the connection between a service consumer and the dynamic service engine, as well as the connection between the engine and a certain service provider. The system handle two types of connections, one is based on HTTP protocol and the other is JDBC connection, and implements the following four security options:

1. Conventional login/password authentication for HTTP.
2. Secure Sockets Layer for HTTP (HTTPS).
3. Conventional login/password authentication for JDBC connections.

Secure Sockets Layer (SSL) for JDBC connections.

CONCLUSION

It is to be understood that the specific embodiment of the invention which has been described is merely illustrative of one application of the principles of the invention. Numerous modifications may be made by those skilled in the art without departing from the true spirit and scope of the invention

What is claimed is:

1. The method of obtaining information via the Internet from each of a plurality of diverse data resources having different characteristics in response to a request from a requesting application program which comprises, in combination, the steps of:
    storing a separate service description for each given data resource in a database, said service description including:
        an Internet address to which an output information request directed to said given data resource may be transmitted,
        a specification of the nature of input information to be supplied by said requesting application program, and
        a description of the nature of output information to be returned to said requesting application program in response to said output information request,
    establishing an application program interface for accepting service requests in standard form from said requesting application program,
    issuing a service request from said requesting application program to said application program interface, said service request identifying a particular resource, and
    executing a service interface program in response to said service request, said service interface program performing the steps of:
        obtaining the particular service description for said particular resource from said database,
        obtaining input information conforming to said specification contained in said particular service description from said requesting application program,
        producing an information request message that includes said input information,
        transmitting said information request message to the Internet address included in said particular service description thereby supplying said input information to said particular resource, and
        routing output information provided by said particular resource in response to said information request to said requesting application program.

2. The method as set forth in claim 1 wherein said step of storing a separate service description for each given data resource comprises registration means for accepting service description information in a predetermined format.

3. The method as set forth in claim 2 wherein said predetermined format is the Extensible Markup Language.

4. The method as set forth in claim 3 wherein said service description as expressed in Extensible Markup Language is validated against a Service Descriptor schema which specifies the content of said service description before said service description is stored in said database.

5. The method as set forth in claim 1 wherein said service description as stored in said database further comprises contact information specifying a person or entity supplying the resource described in said service description.

6. The method as set forth in claim 1 wherein said service description as stored in said database further comprises test information consisting of a fixed input value and a fixed output value which enables said service interface program to perform automatic testing of the described resource by sending said fixed input value to said resource and comparing the resulting output from said resource with said fixed output value.

7. The method as set forth in claim 1 wherein said service description as stored in said database further comprises security information for ensuring that a request for output information originates from an authorized source before that request is satisfied.

8. Apparatus for processing a request for information from a specified resource which comprises, in combination,
    a database for storing a service description for each of a plurality of different resources, said service description comprising an input processing specification, an Internet resource address, and an output processing specification,
    an executing application program for issuing said request for information from said specified resource, and
    an interface program for receiving said request from said executing application program via a standard application program interface, said interface program including:
        means for retrieving the particular service description for said specified resource from said database,
        means for processing input data obtained from said executing application program in accordance with the input processing specification contained in said particular service description for said specified resource to produce a reformatted request,
    means for transmitting said reformatted request to the Internet resource address contained in said particular service description for said specified resource;
        means for receiving a raw response via the Internet from said specified resource in response to said reformatted request,
        means for processing said raw response in accordance with said output processing specification contained in said particular service description for said specified resource to produce a reformatted response, and
        means for transmitting said reformatted response to said executing application program.

9. Apparatus as set forth in claim 8 further including registration means for accepting descriptive data from a remote location and for processing said descriptive data to form said service description stored in said database.

10. Apparatus as set forth in claim 9 wherein in said input processing specification includes the designation of an input adaptor program which, when executed, performs at least some of the processing of said request to produce said reformatted request.

11. Apparatus as set forth in claim 10 wherein said output processing specification includes the designation of an output adaptor program which, when executed, performs at least some of the processing of said raw response to produce said reformatted response.

12. The method of obtaining information via the Internet from each of a plurality of diverse data resources having different characteristics which comprises, in combination, the steps of:

storing a separate service description for each given data resource in a database, said service description including:

an Internet address to which an output information request directed to said given data resource may be transmitted, an input specification of the nature of input processing to be performed on each request before being supplied to said given data resource, an output specification of the nature of output processing to be performed on each response from a given data resource before that response is returned to a requesting application program, and establishing an application program interface for accepting service requests in standard form from executing application programs, receiving a service request identifying a particular resource from an executing application program via said application program interface and executing a service interface program in response to said service request, said service interface program performing the steps of:

obtaining the particular service description for said particular resource from said database, processing said service request in accordance with said input specification contained in said particular service description to produce an output information request, transmitting said output information request to said Internet address specified in said particular service description, receiving raw output data in response to said output information request, processing said raw output data in accordance with said output specification to produce reformatted output information, and transmitting said reformatted output to said executing application program.

13. The method as set forth in claim 12 wherein said step of storing a separate service description or each given data resource comprises registration means for accepting service description information in a predetermined format.

14. The method as set forth in claim 13 wherein said predetermined format is the Extensible Markup Language.

15. The method as set forth in claim 14 wherein said service description as expressed in Extensible Markup Language is validated against a schema which specifies the content of said service description before each of said service descriptions is stored in said database.

16. The method as set forth in claim 12 wherein said service description as stored in said database further comprises contact information specifying a person or entity supplying the resource described in said service description.

17. The method as set forth in claim 12 wherein said service description as stored in said database further comprises test information consisting of at least one fixed input value and at least one fixed output value which enable said service interface program to perform automatic testing of the described resource by sending said fixed input value to said resource and comparing the resulting output from said resource with said fixed output value.

18. The method as set forth in claim 12 wherein said service description as stored in said database further comprises security information for ensuring that a request for output information originates from an authorized source before that request is satisfied.

* * * * *

UNITED STATES PATENT AND TRADEMARK OFFICE
CERTIFICATE OF CORRECTION

| | | |
|---|---|---|
| PATENT NO. | : 7,472,349 B1 | Page 1 of 2 |
| APPLICATION NO. | : 09/584318 | |
| DATED | : December 30, 2008 | |
| INVENTOR(S) | : Srivastava et al. | |

It is certified that error appears in the above-identified patent and that said Letters Patent is hereby corrected as shown below:

In column 5, line 38, delete "Jserver:" and insert -- JServer: --, therefor.

In column 8, line 21, delete "language" and insert -- Language --, therefor.

In column 8, lines 29-30, delete "Language [ISO8879]." and insert -- Language. --, therefor.

In column 11, line 49, delete "from" and insert -- From --, therefor.

In column 15, lines 11-12, delete "Output Specifications" and insert -- 2.1.2.8. Output Specifications --, on Col. 15, Line 12 as a new line.

In column 15, line 15, delete "2.1.2.8." and insert -- 2.1.2.9. --, therefor.

In column 15, line 37, delete "2.1.2.9." and insert -- 2.1.2.10. --, therefor.

In column 15, line 46, delete "from" and insert -- From --, therefor.

In column 16, line 20, after "registration" insert -- . --.

In column 17, line 33, after "tasks" insert -- . --.

In column 20, line 28, delete "asked" and insert -- ask --, therefor.

In column 21, line 32, delete "wants" and insert -- want --, therefor.

In column 24, line 7, after "information" insert -- . --.

In column 24, line 18, after "descriptor" insert -- . --.

In column 26, line 47, delete "A" and insert -- An --, therefor.

Signed and Sealed this

Fourth Day of May, 2010

David J. Kappos
*Director of the United States Patent and Trademark Office*

In column 28, line 34, delete "example." and insert -- example, --, therefor.

In column 28, line 65, delete "wants" and insert -- want --, therefor.

In column 31, line 13, after "connection" insert -- . --.

In column 37, line 12, delete "WILL" and insert -- will --, therefor.

In column 39, line 34, after "invention" insert -- . --.